(12) United States Patent
Sawada et al.

(10) Patent No.: US 9,550,151 B2
(45) Date of Patent: Jan. 24, 2017

(54) SPIRAL-TYPE ACIDIC GAS SEPARATION MODULE

(71) Applicant: FUJIFILM Corporation, Tokyo (JP)

(72) Inventors: Makoto Sawada, Ashigarakami-gun (JP); Yoshihiro Aburaya, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/006,689

(22) Filed: Jan. 26, 2016

(65) Prior Publication Data

US 2016/0136581 A1   May 19, 2016

Related U.S. Application Data

(63) Continuation of application No. PCT/JP2014/068706, filed on Jul. 14, 2014.

(30) Foreign Application Priority Data

Aug. 13, 2013  (JP) .................................. 2013-168064
Jul. 2, 2014   (JP) .................................. 2014-136830

(51) Int. Cl.
  *B01D 53/22*  (2006.01)
  *B01D 63/10*  (2006.01)
  (Continued)

(52) U.S. Cl.
  CPC ............. *B01D 63/10* (2013.01); *B01D 53/228* (2013.01); *B01D 61/38* (2013.01); *B01D 63/103* (2013.01);
  (Continued)

(58) Field of Classification Search
  CPC .................. B01D 2053/221; B01D 2313/105; B01D 2323/21; B01D 2323/283; B01D 2323/286; B01D 2323/46; B01D 53/22; B01D 53/228; B01D 63/10; B01D 69/12; B01D 61/38; B01D 63/103; B01D 69/10; B01D 69/142; B01D 2256/16; B01D 2256/245; B01D 2257/504; C10K 1/024; Y02P 20/152; Y02C 10/10
  See application file for complete search history.

(56) References Cited

U.S. PATENT DOCUMENTS 4,187,086 A * 2/1980 Walmet .................. B01D 53/22
                                                210/321.75
4,767,422 A * 8/1988 Bikson ............... B01D 67/0088
                                                95/51
(Continued)

FOREIGN PATENT DOCUMENTS

AU    6988691 A  *  7/1991 ............. B01D 63/10
EP    0 443 642 A2    8/1991
(Continued)

OTHER PUBLICATIONS

Machine translation of 2009-195900 JP Yamaguchi Jul. 1997.*
(Continued)

*Primary Examiner* — Anthony Shumate
(74) *Attorney, Agent, or Firm* — Birch, Stewart, Kolasch & Birch, LLP

(57) ABSTRACT

There is provided a high-quality spiral-type acidic gas separation module which is obtained by winding a laminate including an acidic gas separation layer that has a facilitated transport film and which has no defects in the facilitated transport film, in which the average value of the fiber diameter of a supply gas channel member is in a range of 100 μm to 900 μm, and the area ratio of concave portions inscribed in a hemisphere having a diameter greater than or equal to three-quarters of the fiber diameter of the supply gas channel member is 50% or less with respect to a surface of (Continued)

an auxiliary support film of a porous support that is on the side opposite to the facilitated transport film.

16 Claims, 6 Drawing Sheets

(51) Int. Cl.
*B01D 69/10* (2006.01)
*C10K 1/02* (2006.01)
*B01D 61/38* (2006.01)
*B01D 69/14* (2006.01)

(52) U.S. Cl.
CPC ............ *B01D 69/10* (2013.01); *B01D 69/142* (2013.01); *C10K 1/024* (2013.01); *B01D 2053/221* (2013.01); *B01D 2256/16* (2013.01); *B01D 2256/245* (2013.01); *B01D 2257/504* (2013.01); *B01D 2313/105* (2013.01); *Y02C 10/10* (2013.01); *Y02P 20/152* (2015.11)

(56) References Cited

U.S. PATENT DOCUMENTS

| | | | | |
|---|---|---|---|---|
| 4,938,778 | A * | 7/1990 | Ohyabu | B01D 69/02 210/500.23 |
| 5,670,053 | A * | 9/1997 | Collentro | B01D 61/022 210/651 |
| 5,753,009 | A * | 5/1998 | Sirkar | B01D 53/22 95/45 |
| 5,922,178 | A * | 7/1999 | Isenberg | B01D 53/00 204/241 |
| 7,799,251 | B2 | 9/2010 | Therriault | B01F 5/0604 264/49 |
| 8,034,729 | B2 * | 10/2011 | Yoshida | B01D 39/163 264/165 |
| 8,197,576 | B2 | 6/2012 | Okada et al. | |
| 2002/0167009 | A1* | 11/2002 | Kim | G02F 1/13458 257/72 |
| 2012/0043272 | A1* | 2/2012 | Yoshida | B01D 63/10 210/457 |
| 2012/0160758 | A1* | 6/2012 | Beauchamp | B01D 63/10 210/321.74 |
| 2012/0298570 | A1* | 11/2012 | Osawa | B01D 25/24 210/202 |
| 2013/0087499 | A1* | 4/2013 | Uda | B01D 63/10 210/497.1 |
| 2013/0199370 | A1* | 8/2013 | Okada | B01D 53/228 95/52 |
| 2013/0220915 | A1* | 8/2013 | Chikura | B01D 63/10 210/457 |
| 2013/0284022 | A1* | 10/2013 | Hiraki | B01D 53/228 96/4 |
| 2013/0299416 | A1* | 11/2013 | Chikura | B01D 63/10 210/457 |
| 2014/0120320 | A1* | 5/2014 | Kanai | B01J 37/0225 428/172 |
| 2014/0231332 | A1* | 8/2014 | Hirozawa | B01D 63/10 210/321.83 |
| 2014/0345462 | A1* | 11/2014 | Itou | B01D 69/12 96/13 |
| 2015/0041388 | A1* | 2/2015 | Hirozawa | B01D 63/10 210/457 |
| 2015/0209736 | A1* | 7/2015 | Ohkame | B01D 61/025 210/490 |
| 2015/0298064 | A1* | 10/2015 | Takagi | B01D 69/10 210/488 |
| 2016/0008765 | A1* | 1/2016 | Aburaya | B01D 69/12 96/11 |
| 2016/0008766 | A1* | 1/2016 | Aburaya | B01D 63/10 422/222 |

FOREIGN PATENT DOCUMENTS

| | | | | |
|---|---|---|---|---|
| JP | 4-215824 | A | | 8/1992 |
| JP | 09195900 | A | * | 7/1997 |
| JP | 4621295 | B2 | | 1/2011 |
| JP | WO 2012014900 | A1 | * | 2/2012 ........... B01D 53/228 |
| JP | WO 2012096055 | A1 | * | 7/2012 ........... B01D 53/228 |

OTHER PUBLICATIONS

International Search Report issued in PCT/JP2014/068706, dated Sep. 9, 2014, 1 pg.

International Preliminary Report on Patentability and Written Opinion of the International Searching Authority (Forms PCT/IB/338, PCT/IB/337 and PCT/ISA/237) dated Feb. 25, 2016, for International Application No. PCT/JP2014/068706, 6 pages.

\* cited by examiner

SPIRAL-TYPE ACIDIC GAS SEPARATION MODULE

CROSS-REFERENCE TO RELATED APPLICATIONS

This application is a Continuation of PCT International Application No. PCT/JP2014/068706 filed on Jul. 14, 2014, which claims priority under 35 U.S.C. §119(a) to Japanese Patent Application No. 2013-168064 filed on Aug. 13, 2013 and Japanese Patent Application No. 2014-136830 filed on Jul. 2, 2014. Each of the above applications is hereby expressly incorporated by reference, in its entirety, into the present application.

BACKGROUND OF THE INVENTION

1. Field of the Invention

The present invention relates to an acidic gas separation module which selectively separates acidic gas from raw material gas. Specifically, the present invention relates to a spiral-type acidic gas separation module obtained by winding a laminate having an acidic gas separation film.

2. Description of the Related Art

In recent years, a technique of selectively separating acidic gas such as carbon dioxide from raw material gas (gas to be treated) has been promoted for the purpose of production of hydrogen gas or purification of natural gas. For example, an acidic gas separation module that separates acidic gas from raw material gas using an acidic gas separation film through which acidic gas selectively permeates has been developed.

Specifically, JP1992-215824A (JP-H04-215824A) discloses an acidic gas separation module obtained by winding a laminate containing an acidic gas separation film around a central tube (central permeable material collection tube), in a tube wall of which through-holes are formed and which is used for collecting separated acidic gas, multiple times.

The acidic gas separation module disclosed in JP1992-215824A (JP-H04-215824A) is a dissolution-diffusion type acidic gas separation module using a so-called dissolution diffusion film as an acidic gas separation film. The dissolution diffusion film separates acidic gas from raw material gas using differences in solubilities of acidic gas and materials to be separated therefrom in a film and differences in diffusibility in a film.

Further, JP4621295B discloses an acidic gas separation module (experimental device) that divides a space into a raw material chamber and a permeation chamber using an acidic gas separation film, supplies raw material gas (mixed gas formed of $CO_2$, $H_2$, and $H_2O$) to the raw material chamber, and removes the acidic gas selectively separated (through permeation) by the acidic gas separation film from the permeation chamber.

The acidic gas separation module disclosed in JP4621295B is a facilitated transport type acidic gas separation module using a so-called facilitated transport film as an acidic gas separation film. The facilitated transport film includes a carrier reacting with acidic gas in the film and separates acidic gas from raw material gas by the acidic gas being transported to the side opposite to the film using the carrier.

In such an acidic gas separation module, with a so-called spiral-type acidic gas separation module obtained by winding a laminate that has an acidic gas separation film around a central tube having through-holes on the wall surface (laminate is wrapped around the central tube), as described in JP1992-215824A (JP-H04-215824A), the area of the acidic gas separation film is able to be very greatly increased. Accordingly, the spiral-type acidic gas separation module is capable of performing a treatment with high efficiency and is markedly effective.

SUMMARY OF THE INVENTION

The spiral-type acidic gas separation module includes a supply gas channel member which becomes a raw material gas channel from which acidic gas is separated and a permeating gas channel member which becomes a channel of acidic gas separated out by an acidic gas separation film in addition to an acidic gas separation film and a central tube, as an example.

The spiral-type acidic gas module including such members has a configuration in which one or a plurality of laminates, each of which is obtained by laminating the acidic gas separation film, the supply gas channel member, and the permeating gas channel member, are wound around the central tube.

For example, JP1992-215824A (JP-H04-215824A) discloses a spiral-type acidic gas separation module obtained by interposing a supply gas channel member (feed material spacer) by folding an acidic gas separation film into two, preparing a laminate formed by laminating a permeating gas channel member (permeable material spacer) on one side of the acidic gas separation films folded into two, and winding a laminated product formed by laminating a plurality of the laminates around a central tube (permeable material collecting tube).

However, according to the examination of the present inventor, when a spiral-type module having a configuration of the above-described acidic gas separation module using a facilitated transport film is configured, occasionally, an acidic gas separation module having a target performance is not obtained.

In other words, the supply gas channel member normally has a network structure in order to constitute a raw material gas channel and to allow the raw material gas flowing therein to be brought into contact with the acidic gas separation film.

In addition, when the hygroscopicity of the facilitated transport film becomes higher, the acidic gas separation film having the facilitated transport film tends to have a higher separation rate (permeation rate) of acidic gas. For this reason, the facilitated transport film uses a hydrophilic compound such as a superabsorbent resin as a binder, has a configuration in which a carrier is dispersed in the binder, and is soft in many cases.

Here, since the spiral-type separation module has a configuration in which the above-described laminate is wound around the central tube, positional deviation occurs between the facilitated transport film and supply gas channel member when the laminate is wound around the central tube.

Due to this positional deviation, the facilitated transport film may slidably come into contact with the supply gas channel member, the facilitated transport film may be damaged, and the film may be partially and substantially removed to become defective in an extreme case. As a result, in the spiral-type acidic gas separation module using the facilitated transport film, a separation module having, a target performance may not be obtained due to this damage to the facilitated transport film in many cases.

The present invention has been made for solving the problems of the related art, and an object thereof is to provide a spiral-type acidic gas separation module which is a spiral-like acidic gas separation module that uses an acidic gas separation layer (separation film) having a facilitated transport film, prevents damage to the facilitated transport film caused by the facilitated transport film slidably coming into contact with a supply gas channel member at the time of winding, and is capable of stably obtaining a module having a target performance.

As a result of intensive examination in order to solve the above-described problems, the present inventor found that the average value of the fiber diameter of a supply gas channel member including at least one of woven fabric and unwoven fabric should be in a range of 100 μm to 900 μm, and damage to the facilitated transport film caused by the facilitated transport film slidably coming into contact with the supply gas channel member at the time of winding can be suppressed by adjusting the area ratio of concave portions inscribed in a hemisphere having a diameter greater than or equal to three-quarters of the fiber diameter of the supply gas channel member to be 50% or less in a surface of an auxiliary support film formed of unwoven fabric that is on the side opposite to the facilitated transport film, thereby completing the present invention.

That is, the present inventor found that the above-described problems can be solved by employing the configuration described below.

(1) There is provided a spiral-type acidic gas separation module including: a central tube in which through-holes are formed; a supply gas channel member which becomes a raw material gas and is formed of at least one of woven fabric and unwoven fabric; an acidic gas separation layer which separates acidic gas from raw material gas flowing in the supply gas channel member and includes a facilitated transport film that contains a carrier reacting with the acidic gas and a hydrophilic compound for carrying the carrier and a porous support that supports the facilitated transport film and allows the acidic gas separated from the facilitated transport film to pass through; and a permeating gas channel member which becomes a channel from which the acidic gas that reacts with the carrier and permeates into the facilitated transport film flows into the central tube, in which the porous support is obtained by laminating a porous film, which is on the facilitated transport film side, on an auxiliary support film which is formed of at least one of woven fabric and unwoven fabric on the penneating gas channel member side, the average value of the fiber diameter of the supply gas channel member is in a range of 100 μm to 900 μm, with respect to a surface of the auxiliary support film that is on the side opposite to the facilitated transport film, the area ratio of concave portions inscribed in a hemisphere having a diameter greater than or equal to three-quarters of the fiber diameter of the supply gas channel member is 50% or less, and at least one laminate which includes the supply gas channel member, the acidic gas separation layer, and the permeating gas channel member is wound around the central tube.

(2) The spiral-type acidic gas separation module according to (1), in which the thickness of the facilitated transport film is in a range of 5 μm to 150 μm.

(3) The spiral-type acidic gas separation module according to (1) or (2), in which the water absorption rate of the facilitated transport film is in a range of 1% to 20%.

(4) The spiral-type acidic gas separation module according to any one of (1) to (3), in which the tensile elastic modulus of the supply gas channel member is in a range of 1 MPa to 500 MPa.

(5) The spiral-type acidic gas separation module according to any one of (1) to (4), in which the supply gas channel member has a network structure formed of threads containing one or more resins selected from polyethylene, polystyrene, polyethylene terephthalate, polytetrafluoroethylene, polyethersulfone, polyphenylene sulfide, polysulfone, polypropylene, polyimide, polyetherimide, polyether ether ketone, and polyvinylidene fluoride.

(6) The spiral-type acidic gas separation module according to any one of (1) to (5), in which the acidic gas separation layer further includes a hydrophobic intermediate layer between the facilitated transport film and the porous support.

(7) The spiral-type acidic gas separation module according to (6), in which the intermediate layer is a layer containing a silicone resin.

(8) The spiral-type acidic gas separation module according to any one of (1) to (7), in which the laminate has a structure in which the permeating gas channel member is laminated on a pinching body formed by interposing the supply gas channel member between the acidic gas separation layers which are folded into two so that the facilitated transport film is inside.

According to the present invention, in the spiral-type acidic gas separation module using the facilitated transport film, it is possible to suitably prevent damage to the facilitated transport film caused by the facilitated transport film slidably coming into contact with the supply gas channel member at the time of winding.

Therefore, according to the present invention, it is possible to stably obtain an acidic gas separation module which prevents degradation of performance due to damage to the facilitated transport film, has excellent stability of a product, and exhibits a target performance.

DESCRIPTION OF THE PREFERRED EMBODIMENTS

Hereinafter, a spiral-type acidic gas separation module of the present invention will be described in detail with reference to preferred examples illustrated in the accompanying drawings.

Figure 1:
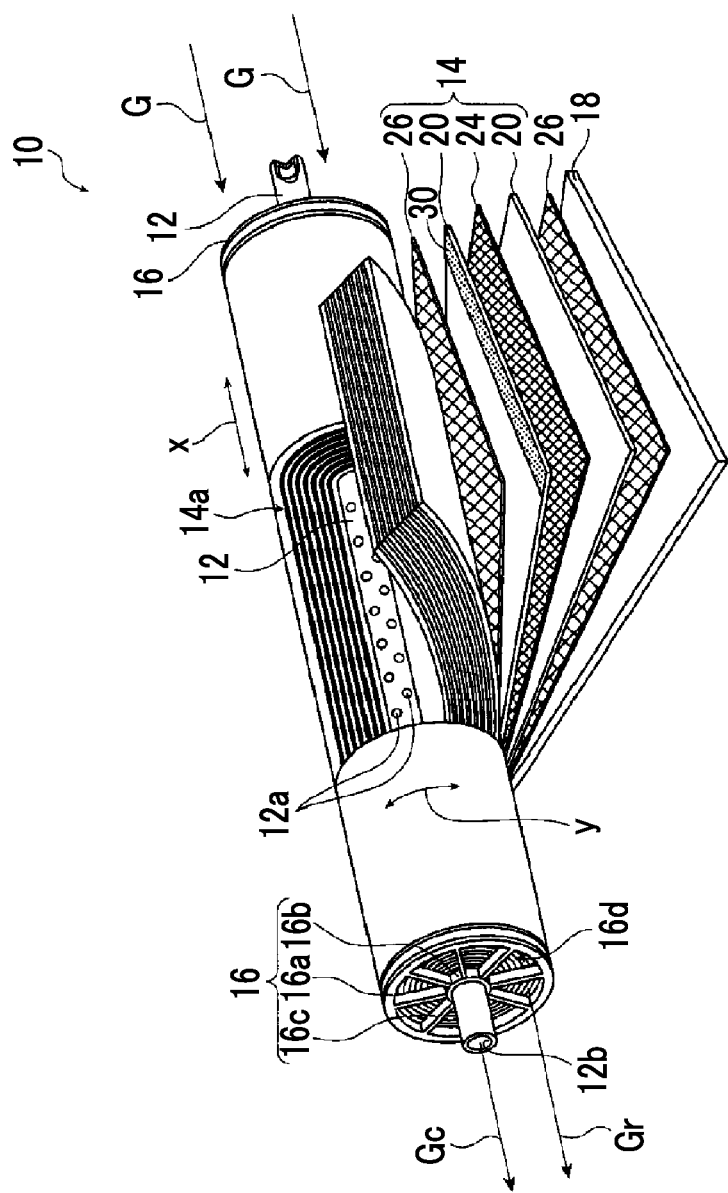
FIG. 1 is a perspective view schematically illustrating an example of an acidic gas separation module of the present invention by cutting out a part thereof.

FIG. 1 is a perspective view schematically illustrating an example of the spiral-type acidic gas separation module of the present invention by cutting out a part thereof.

As illustrated in FIG. 1, a spiral-type acidic gas separation module 10 basically includes a central tube 12, a laminate 14 including an acidic gas separation film (facilitated transport film 21), and a telescoping prevention plate 16. In addition, the spiral-type acidic gas separation module is also simply referred to as a separation module in the description below.

The separation module 10 separates carbon dioxide as acidic gas Gc from raw material gas G containing carbon monoxide, carbon dioxide ($CO_2$), water (water vapor), and hydrogen.

The separation module 10 of the present invention is a so-called spiral-type separation module. That is, the separation module 10 has a configuration in which one or a plurality of sheet-like laminates 14 are laminated on each other and wound around the central tube 12 and telescoping prevention plates 16 are provided on both end surfaces of the wound product of the laminate 14 into which the center tube 12 is inserted. Moreover, the outermost peripheral surface of the laminate 14 wound around the tube is covered by a gas-impermeable coating layer 18.

Further, for the sake of convenience of description, the wound product (that is, a substantially cylindrical material resulting from the laminates 14 which are laminated and wound) which is a product obtained by laminating a plurality of the laminates 14 which are wound around the central tube 12 is referred to as a spiral laminate 14a in the description below.

In such a separation module 10, the raw material gas G from which the acidic gas is separated passes through the telescoping prevention plate 16 (opening portion 16d) on the far side in FIG. 1, is supplied to the end surface of the spiral laminate 14a, flows into the laminate 14 from the end surface, and the acidic gas Gc is separated while flowing in the laminate 14.

Moreover, the acidic gas Gc separated from the raw material gas G by the laminate 14 is discharged from the central tube 12. In addition, the raw material gas G (hereinafter, for the sake of convenience of description, referred to as residual gas Gr) from which the acidic gas has been separated is discharged from the end surface on the side opposite to the supply side of the spiral laminate 14a (laminate 14), and is discharged outside of the separation module 10 after passing through the telescoping prevention plate 16 (in the same manner as described above).

The central tube (permeating gas collecting tube) 12 is a cylindrical tube, in which the end surface on the supply side of the raw material gas G is blocked, and in which a plurality of through-holes 12a are formed on the peripheral surface (tube wall) thereof.

The acidic gas Gc separated from the raw material gas G reaches the inside of the central tube 12 from the through-holes 12a after passing through a permeating gas channel member 26 described below and is discharged from an open end 12b of the central tube 12.

In the central tube 12, the opening ratio (the area ratio of the through-holes 12a occupying the outer peripheral surface of the central tube 12) in a region sealed by an adhesive layer 30 described below is preferably in a range of 1.5% to 80%, more preferably in a range of 3% to 75%, and still more preferably in a range of 5% to 70%. In this, from the practical viewpoint, the opening ratio of the central tube 12 is particularly preferably in a range of 5% to 25%.

When the opening ratio of the central tube 12 is in the above-described range, the acidic gas Gc can be efficiently collected, the strength of the central tube 12 is higher, and the processing suitability can be secured.

Further, it is preferable that the through-hole 12a is a circular hole having a diameter of 0.5 mm to 20 mm. Further, it is preferable that the through-holes 12a are uniformly formed on the peripheral wall of the central tube 12.

In addition, the central tube 12 may be provided with a supply port (supply unit) that supplies gas (sweep gas) for allowing the separated acidic gas Gc to flow into the open end 12b side as needed.

The laminate 14 is obtained by laminating the acidic gas separation layer 20, the supply gas channel member 24, and the permeating gas channel member 26 on each other.

Further, in FIG. 1, the reference number 30 is an adhesive layer 30 that bonds the acidic gas separation layer 20 to the permeating gas channel member 26, bonds the laminates 14 to each other, and makes a channel of the acidic gas Gc in the permeating gas channel member 26 have an envelope form in which the central tube 12 side is open.

As described above, the separation module 10 in the example of the figure has a configuration in which a plurality of the laminates 14 are laminated on each other, are wound around the central tube 12 (the laminates are wrapped around the central tube), and form a substantially cylindrical spiral laminate 14a.

Hereinafter, for the sake of convenience of description, a direction corresponding to the winding of the laminate 14 is set as a circumferential direction (arrow y direction) and a direction perpendicular to the circumferential direction is set as a width direction (arrow x direction). In addition, the laminate 14 is generally a rectangular sheet-like product, but the circumferential direction normally becomes the longitudinal direction of the laminate 14 (the acidic gas separation layer 20, the supply gas channel member 24, and the permeating gas channel member 26).

In the separation module 10, one layer of the laminate 14 may be formed. However, as in the example of the figure, when a plurality of the laminates 14 are laminated on each other, the film area of the acidic gas separation layer 20 is increased and the amount of the acidic gas Gc separated out by one module can be increased. Further, an increase in the film area of the acidic gas separation layer 20 can be attempted by increasing the length of the laminate 14 in the width direction.

The number of sheets of the laminates 14 to be laminated may be appropriately set according to the treatment rate and the treatment amount required for the separation module 10, the size of the separation module 10, and the like. Here, the number of sheets of the laminates 14 to be laminated is preferably 50 or less, more preferably 45 or less, and particularly preferably 40 or less. When the number of sheets of the laminates 14 to be laminated is in the above-described range, the winding of the laminates 14 around the central tube 12 becomes easy and the workability can be improved.

Figure 2:
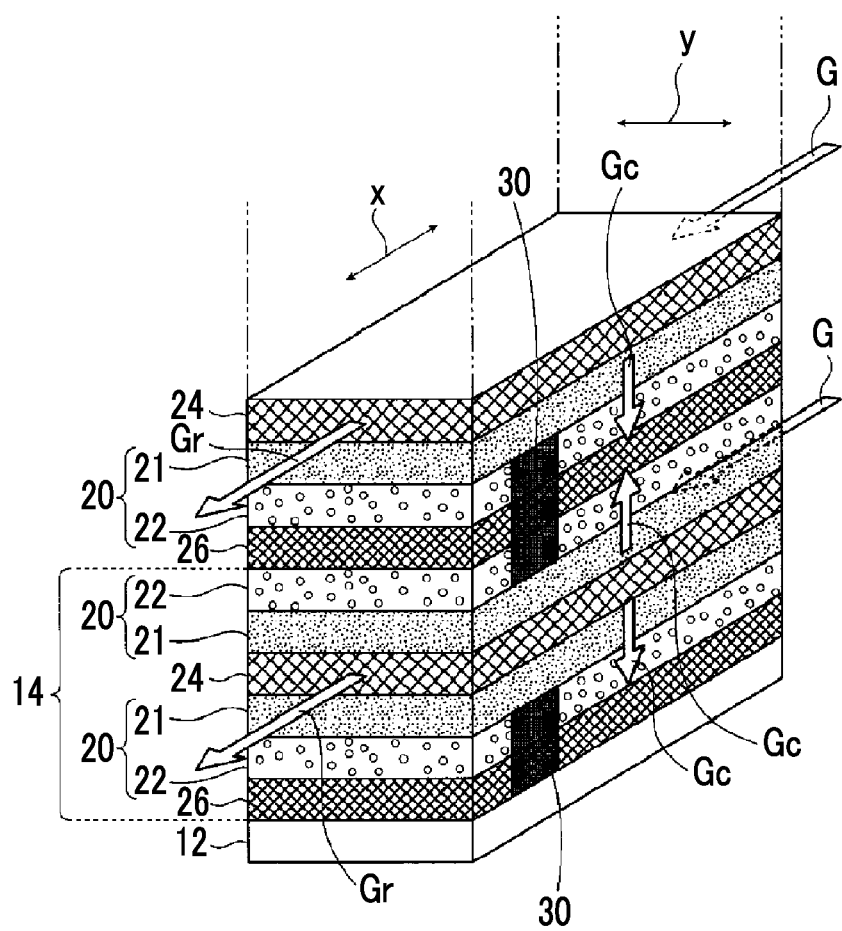
FIG. 2 is a sectional view schematically illustrating a laminate of the acidic gas separation module illustrated in FIG. 1.

FIG. 2 is a partial sectional view illustrating the laminate 14. As described above, the arrow x is the width direction and the arrow y is the circumferential direction.

In the example of the figure, the laminate 14 has a configuration in which the supply gas channel member 24 is interposed between the acidic gas separation films 20 folded into two to form a pinching body 36 (see FIG. 5) and the permeating gas channel member 26 is laminated on the pinching body 36. The configuration will be described below in detail.

As described above, in the separation module 10, the raw material gas G passes through the telescoping prevention plate 16 (the opening portion 16d) and is supplied from the end surface on one side of the spiral laminate 14a. That is, the raw material gas G is supplied to the end portion (end surface) of each laminate 14 in the width direction (arrow x direction).

As conceptually illustrated in FIG. 2, the raw material gas G supplied to the end surface of the laminate 14 in the width direction flows into the supply gas channel member 24 in the width direction. During the flow, the acidic gas Gc which is brought into contact with the acidic gas separation layer 20 (facilitated transport film 21) is separated from the raw material gas G, passes through the acidic gas separation layer 20 in the lamination direction of the laminate 14 (is transported in the lamination direction by a carrier of the facilitated transport film 21), and flows into the permeating gas channel member 26.

The acidic gas Gc flowing into the permeating gas channel member 26 flows in the permeating gas channel member 26 in the circumferential direction (arrow y direction), reaches the central tube 12, and flows into the central tube 12 from the through-holes 12a of the central tube 12.

The flow of the acidic gas Gc is regulated by the adhesive layer 30. That is, in the separation module 10, an envelope-like channel (space), in which the central tube 12 side is open, incorporating the permeating gas channel member 26 on the inside of the adhesive layer 30 in the plane direction is formed by two acidic gas separation layers 20 (facilitated transport films 21) between which the permeating gas channel member 26 is interposed and the adhesive layer 30 having infiltrated into the permeating gas channel member 26 and the acidic gas separation layer 20 (porous support 22) (see FIGS. 5 and 6(A)). In this manner, the separation module 10 prevents the acidic gas Ge, having permeated into the acidic gas separation layer 20, from flowing out.

The adhesive layer 30 will be described below in detail.

The acidic gas Gc flowing into the central tube 12 flows in the central tube 12 in the width direction and is discharged from the open end 12b.

Moreover, the residual gas Gr from which the acidic gas Gc has been removed flows in the supply gas channel member 24 in the width direction, is discharged from the end surface on the side opposite to the spiral laminate 14a, passes through the telescoping prevention plate 16 (the opening portion 16d), and is discharged outside of the separation module 10.

The supply gas channel member 24 supplies the raw material gas G from the end portion in the width direction thereof and brings the raw material gas G flowing in the member into contact with the acidic gas separation layer 20.

Such a supply gas channel member 24 functions as a spacer of the acidic gas separation layer 20 folded into two as described above and constitutes a channel of the raw material gas G. Further, it is preferable that the supply gas channel member 24 causes turbulence in the raw material gas G. Accordingly, in consideration of this point, the supply gas channel member 24 has a network structure (net-like/mesh-like). Among network structures, a network structure formed of threads containing one or more resin materials described below is preferable.

As materials for forming such a supply gas channel member 24, various materials can be used as long as the materials have sufficient heat resistance and moisture resistance.

Preferred examples thereof include paper materials such as paper, high-quality paper, coated paper, cast-coated paper, and synthetic paper; resin materials such as cellulose, polyester, polyolefin, polyamide, polyimide, polysulfone, aramid, and polycarbonate; and inorganic materials such as metals, glass, and ceramics.

Among these, resin materials or materials containing resin materials are preferably exemplified. Specific examples of the resin materials include polyethylene, polystyrene, polyethylene terephthalate (PET), polytetrafluoroethylene (PTFE), polyethersulfone (PES), polyphenylene sulfide (PPS), polysulfone (PSF), polypropylene (PP), polyimide, polyetherimide, polyether ether ketone, and polyvinylidene fluoride. Such resin materials may be used in combination of plural kinds thereof.

The thickness of the supply gas channel member 24 may be appropriately determined according to the amount of the raw material gas G to be supplied or treatment performance to be required.

Specifically, the thickness thereof is preferably in a range of 100 μm to 1000 μm, more preferably in a range of 150 μm to 950 μm, and particularly preferably in a range of 200 μm to 900 μm.

Here, the supply gas channel member 24 is woven fabric or unwoven fabric which is formed of resin threads or the like and has a network structure, and the fiber diameter thereof is in a range of 100 μm to 900 μm.

In the present invention, damage to the facilitated transport film 21 caused by the facilitated transport film 21 slidably coming into contact with the supply gas channel member 24 is prevented at the time of winding the laminate 14 (laminated product obtained by laminating the laminates 14 on each other) around the central tube 12 by defining a relationship between the fiber diameter of the supply gas channel member 24 and the size of the concave portion on the rear surface side of the acidic gas separation layer 20 (the auxiliary support film 22b of the porous support 22).

This point will be described below in detail.

Moreover, it is preferable that the supply gas channel member 24 has a tensile elastic modulus of 1 MPa to 500 MPa.

In a case where the tensile elastic modulus is greater than 500 MPa, that is, in a case where the supply gas channel member 24 is hard, the amount of fibers to be pushed to the film surface becomes larger at the time of winding the laminate and thus the facilitated transport film 21 may be damaged. Therefore, the tensile elastic modulus is preferably 500 MPa or less.

Moreover, in a case where the tensile elastic modulus is less than 1 MPa, since the supply gas channel member 24 becomes soft, the supply gas channel member 24 may not function as a spacer between the acidic gas separation films 20, that is, the channel of the raw material gas may not be secured. Therefore, the tensile elastic modulus is preferably 1 MPa or greater.

In addition, the tensile elastic coefficient of the supply gas channel member 24 is acquired from the relationship between a tensile stress due to a structure of a network structure or the like and the strain amount.

The separation module 10 of the present invention is a facilitated transport type module. Accordingly, the acidic gas separation layer 20 is configured of the facilitated transport film 21 and the porous support 22.

The facilitated transport film 21 includes at least a carrier reacting with the acidic gas Gc contained in the raw material gas G that flows in the supply gas channel member 24 and a hydrophilic compound carrying the carrier. Such a facilitated transport film 21 has a function of allowing the acidic gas Gc to selectively permeate from the raw material gas G (function of selectively transporting the acidic gas Gc).

A property of the facilitated transport type separation module which is required is that the module can be used in a high temperature and high humidity environment. Accordingly, the facilitated transport film 21 has a function of allowing the acidic gas Gc to selectively permeate in a high temperature condition (for example, in a temperature range of 100° C. to 200° C.). Further, when a hydrophilic compound absorbs water vapor so that the facilitated transport film 21 holds moisture even if the raw material gas G contains water vapor, since a carrier more easily transports the acidic gas Gc, the separation efficiency becomes higher than in a case of using a dissolution diffusion film.

The film area of the facilitated transport film 21 may be appropriately set according to the size of the separation module 10, the treatment performance required for the separation module 10, and the like. Specifically, the film area is preferably in a range of 0.01 m² to 1000 m², more preferably in a range of 0.02 m² to 750 m², and still more preferably in a range of 0.025 m² to 500 m². In this, from the practical viewpoint, the film area of the facilitated transport film 21 is particularly preferably in a range of 1 m² to 100 m².

When the film area of the facilitated transport film 21 is in the above-described range, the acidic gas Gc can be efficiently separated out with respect to the film area and the workability becomes improved.

The length of the facilitated transport film 21 (total length before folding into two the circumferential direction may be appropriately set according to the size of the separation module 10, the treatment performance required for the separation module 10, and the like. Specifically, the length thereof is preferably in a range of 100 mm to 10,000 mm, more preferably in a range of 150 mm to 9000 mm, and still more preferably in a range of 200 mm to 8000 mm. In this, from the practical viewpoint, the length of the facilitated transport film 21 is particularly preferably in a range of 800 mm to 4000 mm.

When the length of the facilitated transport film 21 in the circumferential direction is in the above-described range, the acidic gas Ge can be efficiently separated out with respect to the film area, generation of winding deviation at the time of winding the laminate 14 is suppressed, and the workability is improved.

Further, the width of the facilitated transport film may be appropriately set according to the size of the separation module 10 in the width direction.

The thickness of the facilitated transport film 21 may be appropriately set according to the size of the separation module 10, the treatment performance required for the separation module 10, and the like.

Here, although described below, damage to the facilitated transport film 21 caused by the facilitated transport film 21 slidably coming into contact with the supply gas channel member 24 is exemplified as a factor of a decrease in performance of the spiral-type separation module at the time when the laminate 14 (laminated product obtained by laminating the laminates 14) is wound around the central tube 12.

A decrease in performance caused by the damage to the facilitated transport film 21 can be suppressed by thickening the facilitated transport film 21. However, since permeation performance is degraded when the facilitated transport film 21 is thickened, the separation performance of the acidic gas Gc is degraded according to the amount of decrease.

Meanwhile, as described below, since the fiber diameter of the supply gas channel member 24 in the separation module 10 of the present invention is in a range of 100 μm to 900 μm and the area ratio of concave portions inscribed in a hemisphere having a diameter greater than or equal to three-quarters of the fiber diameter of the supply gas channel member 24 is 50% or less in the surface of the auxiliary support film 22b of the porous support 22, damage to the facilitated transport film 21 caused by the facilitated transport film 21 slidably coming into contact with the supply gas channel member 24 at the time of winding the laminate 14 around the central tube 12 can be prevented. That is, even when the thickness of the facilitated transport film 21 is reduced for the purpose of improving the permeation performance, the degradation of performance caused by the damage to the facilitated transport film 21 can be prevented.

When the above-described points are considered, the thickness of the facilitated transport film 21 is preferably in a range of 5 μm to 150 μm and more preferably in a range of 10 μm to 120 μm.

High gas permeability and separation selectivity can be realized by adjusting the thickness of the facilitated transport film 21 to be in the above-described range.

Moreover, the water absorption rate of the facilitated transport film 21 is preferably in a range of 1% to 25% and more preferably in a range of 1% to 20%.

Here, the water absorption rate is a value calculated by the formula "$(B-A)/A \times 100\%$" by setting the mass of the facilitated transport film 21 having dimensions of 10 cm² in an environment of a dew point of $-20°$ C. as A and setting the mass thereof in an environment of 25° C. and a relative humidity of 25% as B.

The permeation performance of the facilitated transport film can be improved by adjusting the water absorption rate of the facilitated transport film 21 to be 1% or greater. When the water absorption rate thereof is less than 1%, cracks are likely to occur due to a bending process or the like at the time of preparation of a module.

Further, when the water absorption rate of the facilitated transport film 21 is adjusted to be 25% or less and more preferably 20% or less, damage to the facilitated transport film 21 caused by the facilitated transport film 21 slidably coming into contact with the supply gas channel member 24 can be prevented. When the water absorption rate thereof is greater than 25%, the facilitated transport film 21 becomes easily damaged due to the slidable contact therebetween.

A hydrophilic compound functions as a binder, holds moisture in the facilitated transport film 21, and exhibits a function of separating out gas such as carbon dioxide using a carrier. Moreover, it is preferable that the hydrophilic compound has a cross-linked structure from a viewpoint of heat resistance.

As such a hydrophilic compound, a hydrophilic polymer is exemplified.

A hydrophilic compound having high hydrophilicity is preferable from viewpoints that the hydrophilic compound is dissolved in water and capable of forming a coating solution and it is preferable that the facilitated transport film 21 has high hydrophilicity (moisture-retaining properties).

Specifically, the hydrophilic compound has a hydrophilicity at which the water absorption amount of physiological saline is preferably 0.5 g/g or greater, more preferably 1 g/g or greater, still more preferably 5 g/g or greater, particularly preferably 10 g/g or greater, and most preferably 20 g/g or greater.

The weight average molecular weight of the hydrophilic compound may be appropriately selected within the range in which a stable film can be formed. Specifically, the weight average molecular weight thereof is preferably 20,000 to 2,000,000, more preferably 25,000 to 2,000,000, and particularly preferably 30,000 to 2,000,000.

By adjusting the weight average molecular weight of the hydrophilic compound to be 20,000 or greater, the facilitated transport film 21 which is stabilized and has sufficient film strength can be obtained.

Particularly, in a case where the hydrophilic compound includes —OH as a crosslinkable group, the weight average molecular weight of the hydrophilic compound is preferably 30,000 or greater. At this time, the weight average molecular weight thereof is more preferably 40,000 or greater and still more preferably 50,000 or greater. Further, in the case where the hydrophilic compound includes —OH as a crosslinkable group, the weight average molecular weight thereof is preferably 600,000 or less from a viewpoint of production suitability.

In addition, in a case where the hydrophilic compound includes —$NH_2$ as a crosslinkable group, the weight average molecular weight of the hydrophilic compound is preferably 10,000 or greater. At this time, the weight average molecular weight of the hydrophilic compound is more preferably 15,000 or greater and particularly preferably 20,000 or greater. Further, in the case where the hydrophilic compound includes —$NH_2$ as a crosslinkable group, the weight average molecular weight thereof is preferably 1,000,000 or less from a viewpoint of production suitability.

Further, a value measured in conformity with JIS K6726 may be used as the weight average molecular weight of the hydrophilic compound in a case where PVA is used as the hydrophilic compound. In addition, when a commercially available product is used, the molecular weight known by a catalog or a specification may be used.

As a crosslinkable group that forms a hydrophilic compound, one which can form a hydrolysis-resistant cross-linked structure is preferably selected.

Specific examples thereof include a hydroxy group (—OH), an amino group (—$NH_2$), a chlorine atom (—Cl), a cyano group (—CN), a carboxy group (—COOH), and an epoxy group. Among these, an amino group and a hydroxy group are preferable. Further, from viewpoints of affinity for a carrier and an effect of carrying a carrier, a hydroxy group is most preferable.

Specific examples of the hydrophilic compound which has a single crosslinkable group include polyallylamine, polyacrylic acid, polyvinyl alcohol, polyvinyl pyrrolidone, polyacrylamide, polyethyleneimine, polyvinylamine, poly-ornithine, polylysine, polyethylene oxide, water-soluble cellulose, starch, alginic acid, chitin, polysulfonic acid, polyhydroxy methacrylate, and poly-N-vinylacetamide. Polyvinyl alcohol is most preferable. In addition, as the hydrophilic compound, a copolymer of these may be exemplified.

Further, examples of the hydrophilic compound having a plurality of crosslinkable groups include a polyvinyl alcohol-polyacrylic acid copolymer. A polyvinyl alcohol-polyacrylic salt copolymer has high water absorption performance and high hydrogel strength at the time of high water absorption, which is preferable.

The percentage content of polyacrylic acid in the polyvinyl alcohol-polyacrylic acid copolymer is in a range of 1% by mole to 95% by mole, preferably in a range of 2% by mole to 70% by mole, still more preferably in a range of 3% by mole to 60% by mole, and particularly preferably in a range of 5% by mole to 50% by mole.

In addition, in the polyvinyl alcohol-polyacrylic acid copolymer, there may be a salt of polyacrylic acid. As the polyacrylate at this time, an ammonium salt or an organic ammonium salt may be exemplified in addition to an alkali metal salt such as a sodium salt or a potassium salt.

The polyvinyl alcohol may be a commercially available product. Specific examples thereof include PVA117 (manufactured by KURARAY CO., LTD.), POVAL (manufactured by KURARAY CO., LTD.), polyvinyl alcohol (manufactured by Sigma-Aldrich Japan K.K.), and J-POVAL (manufactured by JAPAN VAM & POVAL CO., LTD.). The range of the molecular weight varies, but a product having a weight average molecular weight of 130,000 to 300,000 is preferable.

The polyvinyl alcohol-polyacrylate copolymer (sodium salt) may be a commercially available product. For example, KURASTOMER AP20 (manufactured by KURARAY CO., LTD.) is exemplified.

Moreover, in the facilitated transport film 21 of the separation module 10 of the present invention, a hydrophilic compound may be used in a mixture of two or more kinds thereof.

The content of the hydrophilic compound in the facilitated transport film 21 may be determined by appropriately setting the amount thereof which can function as a binder in order to form the facilitated transport film 21 and can sufficiently hold moisture according to the kind of hydrophilic composition or carrier.

Specifically, the content thereof is preferably in a range of 0.5% by mass to 50% by mass, more preferably in a range of 0.75% by mass to 30% by mass, and particularly preferably in a range of 1% by mass to 15% by mass. When the content of the hydrophilic compound is in the above-described range, the function as a binder and the function of holding moisture described above can be stably and suitably exhibited.

The cross-linked structure of the hydrophilic compound can be formed using a known method of the related art, for example, thermal crosslinking, ultraviolet crosslinking, electron beam crosslinking, radiation crosslinking, or photocrosslinking.

Photocrosslinking or thermal crosslinking is preferable and thermal crosslinking is most preferable.

Further, it is preferable to use a crosslinking agent together with a hydrophilic compound in order to form the facilitated transport film 21. That is, it is preferable to use a coating composition containing a crosslinking agent when the facilitated transport film 21 is formed by a coating method.

As the crosslinking agent, a crosslinking agent including two or more functional groups which react with a hydrophilic compound and are capable of performing crosslinking such as thermal crosslinking or photocrosslinking is selected. Further, it is preferable that the cross-linked structure to be formed is a hydrolysis-resistant cross-linked structure.

From this viewpoint, preferred examples of the crosslinking agent to be used for forming the facilitated transport film 21 include an epoxy crosslinking agent, a polyvalent glycidyl ether, a polyhydric alcohol, a polyvalent isocyanate, a polyvalent aziridine, a haloepoxy compound, a polyvalent aldehyde, a polyvalent amine, and an organic metal-based crosslinking agent. A polyvalent aldehyde, an organic metal-based crosslinking agent, and an epoxy crosslinking agent are more preferable. Among these, a polyvalent aldehyde such as glutaraldehyde or formaldehyde having two or more aldehyde groups is preferable.

As the epoxy crosslinking agent, a compound including two or more epoxy groups may be exemplified and a compound including four or more epoxy groups is preferable. The epoxy crosslinking agent is also commercially available and examples thereof include trimethylolpropane triglycidyl ether (EPOLIGHT 100MF or the like, manufactured by KYOEISHA CHEMICAL Co., LTD.), EX-411, EX-313, EX-614B, EX-810, EX-811, EX-821, EX-830, (all manufactured by Nagase Chemtex Corporation), and EPIOL E400 (manufactured by NOF CORPORATION).

In addition, as a compound similar to an epoxy crosslinking agent, an oxetane compound having a cyclic ether is preferably used. A polyvalent glycidyl ether having two or more functional groups is preferable as an oxetane compound, and examples of commercially available products include EX-411, EX313, EX-614B, EX-810, EX-811, EX-821, and EX-830 (all manufactured by Nagase Chemtex Corporation).

Examples of the polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, an oxyethylene-oxypropylene block copolymer, pentaerythritol, and sorbitol.

Examples of the polyvalent isocyanate include 2,4-toluylene diisocyanate and hexamethylene diisocyanate.

Examples of the polyvalent aziridine include 2,2-bishydroxymethylbutanol-tris[3-(1-aziridinyl)propionate], 1,6-hexamethylene diethylene urea, and diphenylmethane-bis-4,4'-N,N'-diethylene urea.

Examples of the haloepoxy compound include epichlorohydrin and α-methylchlorohydrin.

Examples of the polyvalent aldehyde include glutaraldehyde and glyoxal.

Examples of the polyvalent amine include ethylenediamine, diethylenetriamine, triethylenetetramine, tetraethylenepentamine, pentaethylenehexamine, and polyethyleneimine.

Further, examples of the organic metal-based crosslinking agent include an organic titanium crosslinking agent and an organic zirconia crosslinking agent.

For example, in a case where a polyvinyl alcohol having a weight average molecular weight of 130,000 or greater is used as a hydrophilic compound, an epoxy crosslinking agent or glutaraldehyde is preferably used in terms of excellent reactivity with the hydrophilic compound and capability of forming a cross-linked structure having excellent hydrolysis resistance.

In addition, in a case where a polyvinyl alcohol-polyacrylic acid copolymer is used as a hydrophilic compound, an epoxy crosslinking agent or glutaraldehyde is preferably used.

In addition, in a case where a polyallylamine having a weight average molecular weight of 10,000 or greater is used as a hydrophilic compound, an epoxy crosslinking agent, glutaraldehyde, or an organic metal crosslinking agent is preferably used in terms of excellent reactivity with the hydrophilic compound and capability of forming a cross-linked structure having excellent hydrolysis resistance.

In addition, in a case where a polyethyleneimine or polyallylamine is used as a hydrophilic compound, an epoxy crosslinking agent is preferably used.

The amount of a crosslinking agent may be appropriately set according to the kind of hydrophilic compound or crosslinking agent used for forming the facilitated transport film 21.

Specifically, the amount thereof is preferably in a range of 0.001 parts by mass to 80 parts by mass, more preferably 0.01 parts by mass to 60 parts by mass, and particularly preferably 0.1 parts by mass to 50 parts by mass with respect to 100 parts by mass of a crosslinkable group included in the hydrophilic compound. When the content of the crosslinking agent is adjusted to be in the above-described range, the formation properties of the cross-linked structure become excellent and a facilitated transport film with excellent shape-maintaining properties can be obtained.

In addition, when the crosslinkable group included in the hydrophilic compound is considered, it is preferable that the cross-linked structure is formed by reacting 0.001 mol to 80 mol of a crosslinking agent with 100 mol of the crosslinkable group included in the hydrophilic compound.

As described above, in the acidic gas separation layer 20 of the separation module 10, the facilitated transport film 21 contains a carrier in addition to such a hydrophilic compound.

The carrier may be various kinds of water-soluble compound which have affinity for acidic gas (for example, carbon dioxide) and show basicity. Specific examples thereof include an alkali metal compound, a nitrogen-containing compound, and a sulfur oxide.

In addition, a carrier may indirectly react with acidic gas or the carrier itself may directly react with acidic gas.

Examples of the former include carriers which react with another gas contained in a supply gas and show basicity and in which a basic compound thereof reacts with acidic gas. More specifically, the former is a compound which is capable of selectively taking $CO_2$ into the facilitated transport film 21, for example, an alkali metal compound by reacting with steam (moisture) to release $OH^-$ and allowing $OH^-$ to react with $CO_2$.

Examples of the latter include a nitrogen-containing compound and a sulfur oxide in which a carrier has basicity.

Examples of the alkali metal compound include alkali metal carbonates, alkali metal bicarbonates, and an alkali metal hydroxides. Here, an alkali metal element selected from cesium, rubidium, potassium, lithium, and sodium is preferably used as an alkali metal. In addition, in the present invention, the alkali metal compound includes salts and ions thereof in addition to an alkali metal.

Examples of the alkali metal carbonate include lithium carbonate, sodium carbonate, potassium carbonate, rubidium carbonate, and cesium carbonate.

Examples of the alkali metal bicarbonate include lithium hydrogencarbonate, sodium hydrogencarbonate, potassium hydrogencarbonate, rubidium hydrogencarbonate, and cesium hydrogencarbonate.

Further, examples of the alkali metal hydroxide include lithium hydroxide, sodium hydroxide, potassium hydroxide, rubidium hydroxide, and cesium hydroxide.

Among these, an alkali metal carbonate is preferable, and a compound containing potassium, rubidium, and cesium which have high solubility in water are preferable from a viewpoint of excellent affinity for acidic gas.

Moreover, when an alkali metal compound is used as a carrier, two or more kinds of carrier may be used in combination.

When two or more kinds of carrier are present in the facilitated transport film 21, different kinds of carriers in the film can be separated from each other. In this manner, adhesion (blocking) of the facilitated transport films 21 to each other or adhesion of the facilitated transport film 21 to another member, caused by hygroscopicity of the facilitated transport film 21, can be suitably suppressed at the time of production or the like due to a difference in deliquescency among a plurality of carriers.

In addition, in a case where two or more kinds of alkali metal compound are used as carriers, it is preferable that a first compound having deliquescency and a second compound having a lower deliquescency than that of the first compound and having a small specific gravity are included in terms that the effect of suppressing blocking can be more suitably obtained. As an example, cesium carbonate is exemplified as the first compound and potassium carbonate is exemplified as the second compound.

As the nitrogen-containing compounds, amino acids such as glycine, alanine, serine, proline, histidine, taurine, and diaminopropionic acid; hetero compounds such as pyridine, histidine, piperazine, imidazole, and triazine; alkanolamines such as monoethanolamine, diethanolamine, triethanolamine, monopropanolamine, dipropanolamine, and tripropanolamine; cyclic polyether amines such as cryptand [2.1] and cryptand[2.2]; bicyclic polyether amines such as cryptand[2.2.1] and cryptand[2.2.2]; porphyrin; phthalocyanine; and ethylenediaminetetraacetic acid can be used.

As sulfur compounds, amino acids such as cystine and cysteine; polythiophene; and dodecylthiol can be used.

The content of carriers in the facilitated transport film 21 may be suitably set according to the kind of carrier and hydrophilic compound. Specifically, the content thereof is preferably in a range of 0.3% by mass to 30% by mass, more preferably in a range of 0.5% by mass to 25% by mass, and particularly preferably in a range of 1% by mass to 20% by mass.

When the content of the carriers in the facilitated transport film 21 is adjusted to be in the above-described range, salting-out before application can be suitably prevented in a composition (coating material) used for forming the facilitated transport film 21 and the facilitated transport film 21 can reliably exhibit the function of separating out acidic gas.

The facilitated transport film 21 (composition used for forming the facilitated transport film 21) may contain various components as needed in addition to such a hydrophilic compound, a crosslinking agent, and a carrier.

Examples of such a component include an antioxidant such as dibutylhydroxytoluene (BHT); a specific compound such as a compound which includes an alkyl group having 3 to 20 carbon atoms or a fluorinated alkyl compound having 3 to 20 carbon atoms and a hydrophilic group, or a compound having a siloxane structure; a surfactant such as sodium octanate or sodium 1-hexasulfonate; and polymer particles such as polyolefin particles or polymethyl methacrylate particles.

In addition, if necessary, a catalyst, a moisturizing agent (moisture absorbent), a co-solvent, a film strength control agent, or a defect detection agent may be used.

The acidic gas separation layer 20 is configured of such a facilitated transport film 21 and the porous support 22.

The porous support 22 has acidic gas permeability, allows application of a coating composition (capable of supporting a coating film) for forming the facilitated transport film 21 to be performed thereon, and supports the formed facilitated transport film 21.

In order to exhibit such functions, the porous support 22 has a two-layer configuration formed by laminating the porous film 22a and the auxiliary support film 22b.

When the porous support 22 has such a two-layer structure, the porous support 22 more reliably exhibits functions, for example, the above-described acidic gas permeability, the application of a coating composition which becomes the facilitated transport film 21, and the support of the facilitated transport film 21.

In the porous support 22 having the two-layer structure, the porous film 22a becomes the facilitated transport film 21 side.

It is preferable that the porous film 22a has heat resistance and is formed of a material having low hydrolyzability. Specific examples of such a porous film 22a include a membrane filter film such as those of polysulfone, polyethersulfone, polypropylene, or cellulose; an interfacial polymerization thin film such as those of polyamide or polyimide; and a stretched porous film such as those of polytetrafluoroethylene (PTFE) or high-molecular-weight polyethylene.

Among these, a stretched porous film such as PTFE or high-molecular-weight polyethylene is preferable from viewpoints of having high porosity, less diffusion inhibition of acidic gas (particularly, carbon dioxide), strength, production suitability, and the like. Among stretched porous films, a stretched porous film of PTFE is preferably used in terms of heat resistance, less hydrolyzability, and the like.

In order for the facilitated transport film 21 containing moisture to easily infiltrate into a porous portion in a use environment and for performance of film thickness distribution or aging not to be degraded, it is preferable that the porous film 22a is hydrophobic.

In addition, the maximum pore diameter of the porous film 22a is preferably 1 µm or less.

Further, the average pore diameter of the porous film 22a is preferably in a range of 0.001 µm to 10 µm, more preferably in a range of 0.002 µm to 5 µm, and particularly preferably in a range of 0.005 µm to 1 µm. When the average pore diameter of the porous film 22a is adjusted to be in the above-described range, an adhesive sufficiently permeates into a region to be coated with the adhesive described below, and it is possible to suitably prevent the porous film 22a from inhibiting passing through of acidic gas.

The auxiliary support film 22b is provided for reinforcing the porous film 22a.

Various kinds of material can be used for the auxiliary support film 22b as long as the strength, drawing resistance, and gas permeability to be required for the film are satisfied. For example, non-woven fabric, woven fabric, or a net can be appropriately selected and used.

It is preferable that the auxiliary support film 22b is formed of a material which has heat resistance and low hydrolyzability similar to the porous film 22a described above.

As fibers constituting the non-woven fabric, woven fabric, or knitted fabric, fibers formed of polyolefin such as polypropylene (PP); reforming polyamide such as ARAMID (trade name); and a fluorine-containing resin such as polytetrafluoroethylene or polyvinylidene fluoride which have excellent durability and heat resistance are preferable. It is preferable that the same materials are used for resin materials constituting a mesh. Among these materials, a particularly suitable example is non-woven fabric formed of polypropylene (PP) which is inexpensive and has high mechanical strength.

When the porous support 22 includes the auxiliary support film 22b, the mechanical strength can be improved. For this reason, even though handling is performed by a coating device using RtoR (hereinafter, also referred to as RtoR)

described below, it is possible to prevent the porous support 22 from becoming wrinkled and the productivity can be improved.

When the porous support 22 is thin, strength is a problem. In consideration of this point, the film thickness of the porous film 22a is preferably in a range of 5 μm to 100 μm and the film thickness of the auxiliary support film 22b is in a range of 50 μm to 300 μm.

Here, it is preferable that the auxiliary support film 22b including woven fabric or non-woven fabric which is formed of threads has a low fiber density from a viewpoint of gas permeability. However, when the fiber density is decreased, the facilitated transport film 21 deteriorates in some cases.

After intensive examination, the present inventor found that fibers of the supply gas channel member 24 are fitted into the acidic gas separation layer 20 in a position of the space (unevenness) while the laminate 14 is wound around the central tube 12, the surface of the facilitated transport film 21 on the supply gas channel member 24 side becomes scratched, and the facilitated transport film 21 is damaged in some cases when a space into which the fibers of the supply gas channel member 24 are fitted is present on the inside of the auxiliary support film 22b. Further, in an extreme case, the facilitated transport film 21 is partially or substantially entirely removed and turned into a defective portion, the raw material gas G leaks and separation performance is degraded, or a pressure to be applied for treating the raw material gas G is reduced in some cases (decrease in airtightness).

Meanwhile, in the present invention, the area ratio of concave portions inscribed in a hemisphere having a diameter greater than or equal to three-quarters of the fiber diameter (average value) of the supply gas channel member 24 is 50% or less in the surface of the auxiliary support film 22b that is on the side opposite to the porous film 22a (facilitated transport film 21) (that is, the rear surface of the auxiliary support film 22b (porous support 22)). In this manner, it is possible to prevent damage to the facilitated transport film caused by the facilitated transport film 21 slidably coming into contact with the supply gas channel member 24 at the time of winding.

For this reason, according to the present invention, the separation module 10 which has high production stability and high airtightness with no decrease in performance caused by the damage to the facilitated transport film 21, no leakage of the raw material gas G, no decrease in pressure, and a target performance can be obtained.

Here, the area ratio of the concave portions is a ratio of the area of the concave portions to the area of the auxiliary support film 22b when seen from the direction perpendicular to the rear surface of the auxiliary support film 22b.

This point will be described in more detail with reference to FIG. 3.

Figure 3:
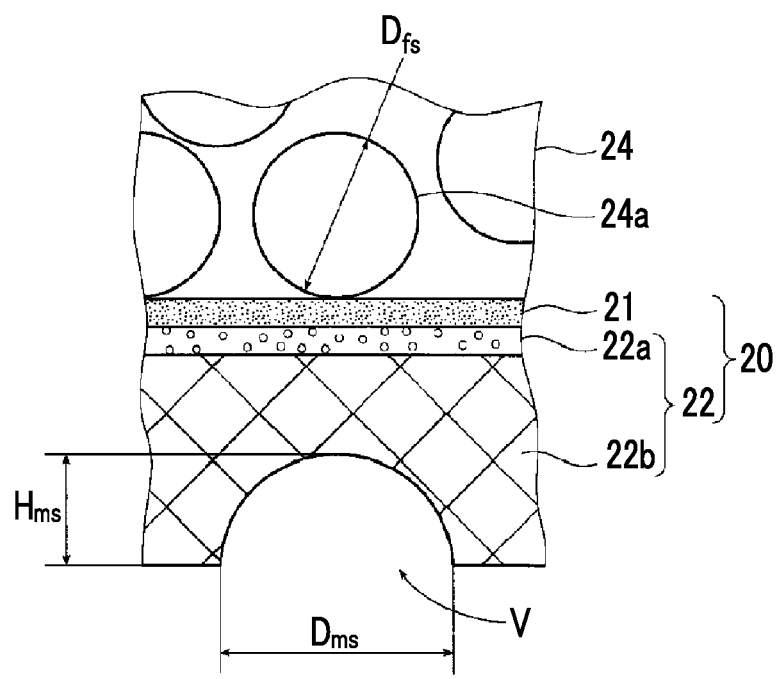
FIG. 3 is a sectional view schematically illustrating the laminate of the acidic gas separation module by enlarging a part thereof.

FIG. 3 is a sectional view schematically illustrating the acidic gas separation layer 20 and the supply gas channel member 24 of the laminate 14 by enlarging a part thereof.

In a case where the fiber density of the auxiliary support film 22b is decreased for gas permeability and the number of gaps in the inside of the auxiliary support film 22b is increased, large gaps are partially formed in some cases due to non-uniformity of fibers as illustrated in FIG. 3. Moreover, FIG. 3 illustrates a case in which large gaps are exposed to the surface on the rear surface side and a concave portion V is formed.

When such a large gap is formed in the auxiliary support film 22b and the diameter of the large gap is greater than the fiber diameter of the supply gas channel member, a fiber 24a of the supply gas channel member 24 is pushed into the gap in the acidic gas separation film 20 when the laminate 14 in which the acidic gas separation film 20 or the like is laminated is wound around the central tube 12, the gap (concave portion V) of the auxiliary support film 22b is reflected on the facilitated transport film 21 side, and the fiber 24a is fitted into the concave portion V. Since the facilitated transport film 21 on the surface of the acidic gas separation layer 20 is in a gel state and is soft, the facilitated transport film 21 becomes damaged and defects occur and thus a separation module having a target performance cannot be obtained in some cases when the supply gas channel member 24 moves relative to the acidic gas separation layer 20 in the state in which the fiber 24a is fitted into the concave portion V.

Meanwhile, in the present invention, the average value of the fiber diameter of the supply gas channel member 24 is set to in a range of 100 μm to 900 μm and the area ratio of concave portions inscribed in a hemisphere having a diameter greater than or equal to three-quarters of the fiber diameter of the supply gas channel member 24 is set to 50% or less in the surface of the auxiliary support film 22b of the porous support 22.

In this manner, it is possible to prevent the fibers of the supply gas channel member 24 from being fitted into the unevenness of the acidic gas separation layer 20 at the time of winding and to prevent damage to the facilitated transport film 21.

Here, for the concave portion V inscribed in a hemisphere having a diameter greater than or equal to three-quarters of the fiber diameter, it can be said that a diameter Dv of a circle inscribed in an opening of the concave portion V is greater than or equal to three-quarters of the fiber diameter of the supply gas channel member 24 and a radius Rv of a circle inscribed in the section of the concave portion is greater than or equal to three-quarters of the radius of the fiber of the supply gas channel member 24 as illustrated in FIG. 3.

In addition, since large gaps generated in the auxiliary support film 22b are generated due to unevenness of distribution of fibers, large gaps are randomly formed in the auxiliary support film 22b. Accordingly, large gaps can be regarded as being present in the auxiliary support film 22b according to the proportion of the concave portions V on the surface of the auxiliary support film 22b.

Moreover, the area ratio of concave portions inscribed in a hemisphere having a diameter greater than or equal to three-quarters of the fiber diameter of the supply gas channel member 24 is preferably 45% or less and more preferably 40% or less. When the area ratio of the concave portion is adjusted to be in the above-described range, the fibers of the supply gas channel member 24 are fitted into the unevenness of the acidic gas separation layer 20 and damage to the facilitated transport film 21 can be more suitably prevented.

Further, the average value of the fiber diameter of the supply gas channel member 24 is 100 μm or greater. When the fiber diameter is small, the proportion of the concave portion on the surface of the auxiliary support film 22b becomes relatively high and thus the auxiliary support film is easily penetrated. Therefore, the fiber diameter of the supply gas channel member 24 is set to 100 μm or greater.

In addition, when the fiber diameter is large, the proportion of the concave portions on the surface of the auxiliary support film 22b becomes relatively small, but the flexibility of the supply gas channel member 24 is decreased. Accordingly, the acidic gas separation layer 20 (facilitated transport film 21) is easily penetrated at the time of winding. Consequently, the fiber diameter of the supply gas channel member 24 is set to 900 μm or less.

Such an acidic gas separation layer 20 can be produced using a so-called coating method in which a coating composition (coating material/coating solution) containing, a component which becomes the facilitated transport film 21 is prepared, and the porous support 22 (porous film 22a) is coated with the coating composition and dried.

That is, first, a coating composition which becomes the facilitated transport film 21 can be prepared by adding respectively appropriate amounts of a hydrophilic compound, a carrier, and other components to be added if necessary to water (room temperature water or hot water) and sufficiently stirring the solution.

In the preparation of the coating composition, dissolution of each component may be promoted by stirring and heating the solution if necessary. In addition, after a hydrophilic compound is added to water and dissolved therein, deposition (salting-out) of the hydrophilic compound can be effectively prevented by gradually adding a carrier to the solution and stirring the same.

The acidic gas separation layer 20 is prepared by coating the porous support 22 with the composition and drying the porous support.

Here, the application and the coating of the composition and drying may be performed with a cut sheet-like porous support 22, a so-called sheet type, which is cut to have a predetermined size.

Preferably, the preparation of the acidic gas separation layer 20 is performed by a so-called RtoR. That is, the porous support 22 is sent from a feeding roll formed by being wound around a long porous support 22, conveyed in the longitudinal direction, and coated with the prepared coating composition. Next, the coating composition (coating film) which is applied to the support is dried, the acidic gas separation layer 20 obtained by forming the facilitated transport film 21 on the surface of the porous support 22 is prepared, and the prepared acidic gas separation layer 20 is wound.

The conveying speed of the porous support 22 in RtoR may be appropriately set according to the kind of porous support 22 or the viscosity of the coating solution.

Here, when the conveying speed of the porous support 22 is extremely high, the uniformity in film thickness of a coating film of the coating composition may be decreased. Further, when the conveying speed thereof is extremely low, the productivity is decreased. When this point is considered, the conveying speed of the porous support 22 is preferably 0.5 m/min or greater, more preferably 0.75 m/min to 200 m/min, and particularly preferably 1 m/min to 200 m/min.

Various kinds of known method can be used as the method of applying the coating composition.

Specific examples thereof include a curtain flow coater, an extrusion die coater, an air doctor coater, a blade coater, a rod coater, a knife coater, a squeeze coater, a reverse roll coater, and a bar coater.

The coating film of the coating composition may be dried using a known method. As an example, a drying method using hot air is exemplified.

The air speed of the hot air may be appropriately determined by setting a speed thereof which can rapidly dry a gel membrane and at which the gel membrane does not collapse. Specifically, the air speed thereof is preferably in a range of 0.5 m/min to 200 m/min, more preferably in a range of 0.75 m/min to 200 m/min, and particularly preferably in a range of 1 m/min to 200 m/min.

The temperature of the hot air may be determined by appropriately setting a temperature at which deformation or the like of the porous support 22 does not occur and the gel membrane can be rapidly dried. Specifically, the temperature of the film surface is preferably in a range of 1° C. to 120° C., more preferably 2° C. to 115° C., and particularly preferably 3° C. to 110° C.

Moreover, the porous support 22 may be heated for drying the coating film if necessary.

Here, the acidic gas separation layer may further include a hydrophobic intermediate layer between the facilitated transport film 21 and the porous support 22.

As described above, since the facilitated transport film 21 is required to hold a large amount of moisture in the film in order to make a carrier sufficiently function, a polymer having extremely high water absorption properties and water-retaining properties is used. In addition, the water absorption amount increases in the facilitated transport film 21 and separation performance of the acidic gas improves as the content of a carrier such as a metal carbonate becomes larger. For this reason, the facilitated transport film 21 is likely to be a gel film or a film having low viscosity. Further, at the time of separating out of the acidic gas, the raw material gas, for example, in a temperature range of 100° C. to 130° C. and at a humidity of approximately 90% is supplied at a pressure of approximately 1.5 MPa. Consequently, due to this use, the facilitated transport film 21 gradually infiltrates (permeates) into the porous support 22 and separation performance of the acidic gas tends to be degraded with time.

For this reason, as a preferred mode of the porous film 22a which becomes the surface on the facilitated transport film 21 side of the porous support 22, the porous film 22a has a hydrophobicity from a viewpoint of suppressing permeation of the facilitated transport film as described above, but it is more preferable that a hydrophobic intermediate layer is included between the facilitated transport film 21 and the porous support 22 from a viewpoint of more effectively suppressing permeation of the facilitated transport film 21 into the porous support 22.

The intermediate layer is not particularly limited as long as the layer has gas permeability with hydrophobicity, but it is preferable that the intermediate layer has air conductivity and is a layer denser than the porous film 22a. When such an intermediate layer is included, it is possible to form the intermediate layer in such a manner that infiltration of the facilitated transport film 21 having high uniformity into the porous support 22 is prevented.

Here, the intermediate layer may be formed on the porous film 22a or may have an infiltration region which infiltrates into the porous film 22a. It is preferable that the infiltration region is smaller within a range in which properties of adhesion of the porous film 22a to the intermediate layer are excellent.

As the intermediate layer, a polymer layer having a siloxane bond in a repeating unit is preferable. Examples of such a polymer layer include silicone-containing polyacetylene such as organopolysiloxane (a silicone resin) or polytrimethyl silyl propyne. As a specific example of the organopolysiloxane, an organopolysiloxane represented by the following formula is exemplified.

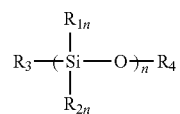

Further, in the formula above, n represents an integer of 1 or greater. Here, from viewpoints of availability, volatility, and viscosity, the average value of n is preferably in a range of 10 to 1,000,000 and more preferably in a range of 100 to 100,000.

In addition, $R_{1n}$, $R_{2n}$, $R_3$, and $R_4$ each independently represent any one selected from a group consisting of a hydrogen atom, an alkyl group, a vinyl group, an aralkyl group, an aryl group, a hydroxyl group, an amino group, a carboxyl group, and an epoxy group. Further, n number of $R_{1n}$'s and $R_{2n}$'s may be the same as or different from each other. In addition, an alkyl group, an aralkyl group, and an aryl group may have a ring structure. Further, the alkyl group, the vinyl group, the aralkyl group, and the aryl group may include a substituent and the substituent is selected from an alkyl group, a vinyl group, an aryl group, a hydroxyl group, an amino group, a carboxyl group, an epoxy group, and a fluorine atom. These substituents can further include a substituent if possible.

As an alkyl group, a vinyl group, an aralkyl group, and an aryl group selected for $R_{1n}$, $R_{2n}$, $R_3$, and $R_4$, from a viewpoint of availability, an alkyl group having 1 to 20 carbon atoms, a vinyl group, an aralkyl group having 7 to 20 carbon atoms, and an aryl group having 6 to 20 carbon atoms are preferable.

Particularly, it is preferable that $R_{1n}$, $R_{2n}$, $R_3$, and $R_4$ represent a methyl group or an epoxy-substituted alkyl group, and epoxy-modified polydimethyl siloxane (PDMS) or the like can be suitably used.

It is preferable that a silicone resin layer as an intermediate layer is formed by a coating film. A coating solution (silicone coating solution) used for film formation may include a monomer, a dimer, a trimer, an oligomer, or a prepolymer of a compound which becomes a silicone resin layer, or a mixture of these. The silicone resin layer may further include a curing agent, a curing accelerator, a cross-linking agent, a thickener, or a reinforcing agent. The cross-linked structure of the coating film can be formed using a known method of the related art, for example, thermal crosslinking, ultraviolet crosslinking, electron beam crosslinking, radiation crosslinking, or photocrosslinking. Photocrosslinking or thermal crosslinking is preferable and ultraviolet crosslinking is most preferable from viewpoints of reducing deformation of a support (curls of the support and deterioration of the coating film) and reducing deterioration of a resin constituting the support.

Moreover, a method of curing a silicone coating solution may be appropriately used for curing the silicone coating solution according to the kind of monomer contained in the silicone coating solution.

Specifically, application of ultraviolet rays, application of electron beams, heating, or humidification is exemplified.

The intermediate layer is a film having gas permeability, but the gas permeability can be significantly degraded when the thickness thereof is extremely large. The intermediate layer may be thin if the intermediate layer entirely covers the surface of a hydrophobic porous film without any space left. From this viewpoint, the film thickness of the intermediate layer is preferably in a range of 0.01 µm to 30 µm and more preferably in a range of 0.1 µm to 15 µm.

The permeating gas channel member 26 is further laminated on the laminate 14.

The permeating gas channel member 26 is a member for allowing the acidic gas Gc having permeated into the acidic gas separation layer 32 by reacting with a carrier to flow into the through-holes 12a of the central tube 12.

As described above, in the example illustrated in the figure, the laminate 14 has a pinching body 36 formed by interposing the supply gas channel member 24 between the acidic gas separation layers 20 which are folded into two so that the facilitated transport film 21 is inside. One laminate 14 is configured by laminating the permeating gas channel member 26 on the pinching body 36 and bonding the permeating gas channel member 26 to the pinching body 36 using the adhesive layer 30.

The permeating gas channel member 26 functions as a spacer between the laminates 14 and forms a channel of the acidic gas Gc that reaches the through-holes 12a of the central tube 12 toward the center of the winding (inside) of the laminates 14 and is separated from the raw material gas G. Further, for the purpose of suitably forming the channel of the acidic gas Gc, infiltration of the adhesive layer 30 described below is required. From this viewpoint, as the permeating gas channel member 26, a member having a network structure (net-like/mesh-like) is preferable similar to the supply gas channel member 24.

Various materials can be used as materials forming the permeating gas channel member 26 as long as the materials have sufficient strength or heat resistance. Specific preferred examples thereof include polyester-based materials such as epoxy-impregnated polyester; polyolefin-based materials such as polypropylene; and fluorine-based materials such as polytetrafluoroethylene.

The thickness of the permeating gas channel member 26 may be appropriately determined according to the amount of the raw material gas G to be supplied or treatment performance or the like to be required.

Specifically, the thickness thereof is preferably in a range of 100 µm to 1000 µm, more preferably in a range of 150 µm to 950 µm, and particularly preferably in a range of 200 µm to 900 µm.

As described above, the permeating gas channel member 26 becomes a channel of the acidic gas Gc permeating into the acidic gas separation layer 20 which is separated from the raw material gas G.

Accordingly, it is preferable that resistance to flowing gas is small in the permeating gas channel member 26. Specifically, a member which has a high porosity, is not greatly deformed when a pressure is applied thereto, and has a low pressure loss is preferable.

The porosity of the permeating gas channel member 26 is preferably in a range of 30% to 99%, more preferably in a range of 35% to 97.5%, and particularly preferably in a range of 40% to 95%.

Further, the deformation at the time when a pressure is applied can be approximated by elasticity when a tensile test is performed. Specifically, the elasticity when a load having a magnitude of 10 N/10 mm is applied is preferably within 5% and more preferably within 4%.

Moreover, the pressure loss can be approximated by a flow rate loss of compressed air flowing at a constant flow rate. Specifically, when air is allowed to flow in the permeating gas channel member 26 having a dimension of 15 $cm^2$ at a rate of 15 L/min at room temperature, the flow rate loss is preferably less than 7.5 L/min and more preferably less than 7 L/min.

Hereinafter, a method of laminating the laminate 14 and a method of winding the laminated laminates 14, that is, a method of preparing the spiral laminate 14a will be described. Further, for the purpose of clearly showing the configuration by simplifying the drawings, FIGS. 4(A) to 7 used for description below illustrate only the end surfaces (end portions) of the supply gas channel member 24 and the permeating gas channel member 26 as a net shape.

Figure 4A:
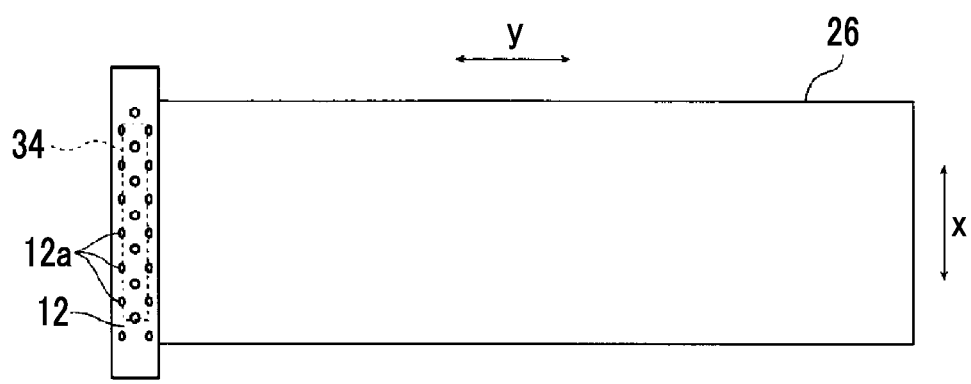
FIGS. 4(A) and 4(B) are conceptual views for describing a method of preparing the acidic gas separation module illustrated in FIG. 1.
Figure 4B:

First, as conceptually illustrated in FIGS. 4(A) and 4(B), the end portion of the permeating gas channel member 26 is fixed to the central tube 12 using a fixing means 34 such as an instant glue by matching the extending direction and the lateral direction of the central tube 12 to each other.

Figure 5:
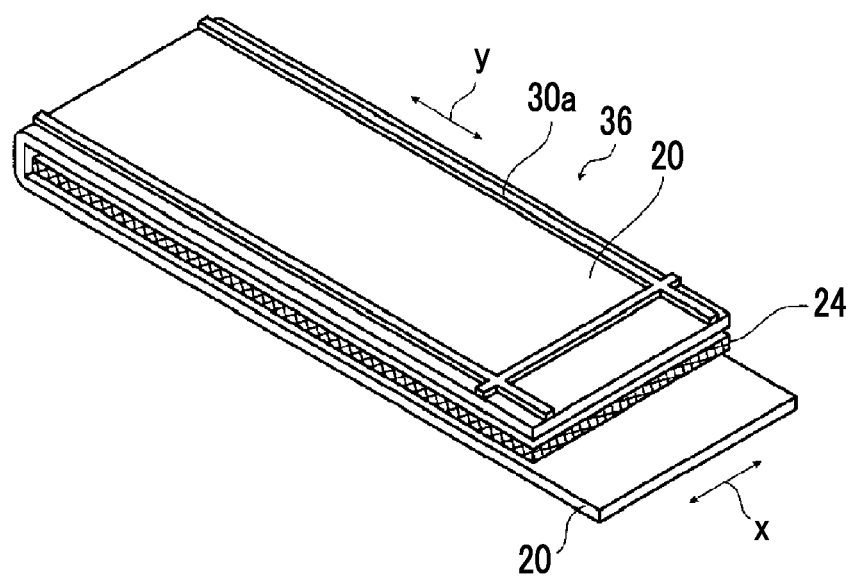
FIG. 5 is a conceptual view for describing the method of preparing the acidic gas separation module illustrated in FIG. 1.

Meanwhile, as conceptually illustrated in FIG. 5, the supply gas channel member 24 is interposed between the acidic gas separation layers 20 which are folded into two so that the facilitated transport film 21 is inside. That is, the supply gas channel member 24 is made into the pinching body 36 interposed between the acidic gas separation layers 20 folded into two. In addition, at this time, the acidic gas separation layer 20 is not uniformly folded into two. As illustrated in FIG. 5, the acidic gas separation layer 20 is folded into two such that one side is slightly longer.

Further, in order to prevent damage to the facilitated transport film 21 caused by the supply gas channel member 24, it is preferable that a sheet-like protection member (for example, a Kapton tape or the like) folded into two is arranged in a valley portion obtained by folding the acidic gas separation layer 20 into two.

Further, the surface on the shorter side of the acidic gas separation layer 20 folded into two (surface of the porous support 22) is coated with the adhesive 30a which becomes the adhesive layer 30.

Here, the adhesive 30a (that is, the adhesive layer 30) is applied to the entire region by being extended to have a strip shape in the circumferential direction (arrow y direction) in the periphery of both end portions in the width direction (arrow x direction) as illustrated in FIG. 5, and is further applied to the entire region by being extended to have a strip shape in the periphery of the end portion in the width direction on the side opposite to the folded portion.

Figure 6A:
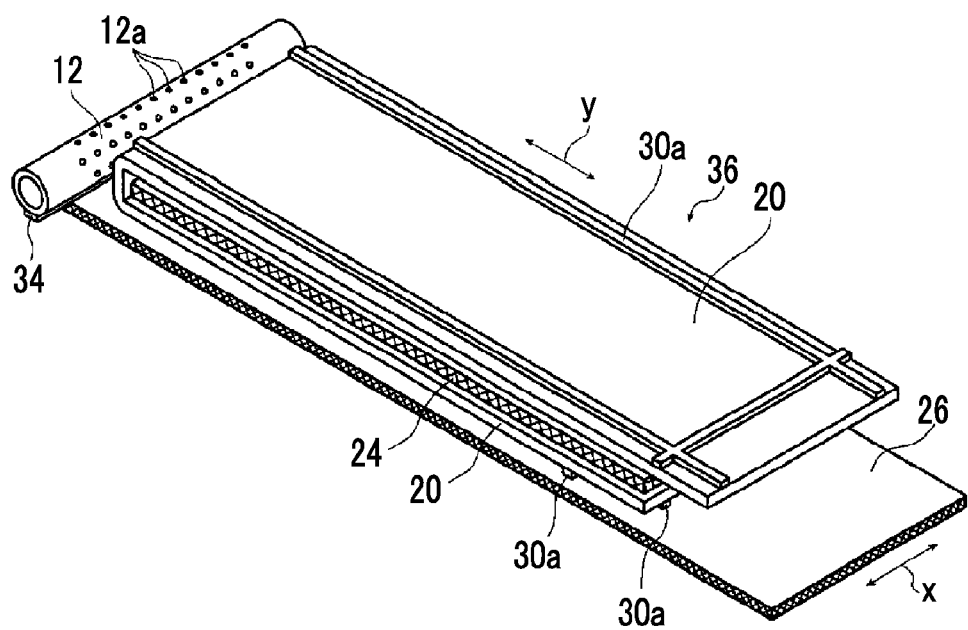
FIGS. 6(A) and 6(B) are conceptual views for describing the method of preparing the acidic gas separation module illustrated in FIG. 1.
Figure 6B:
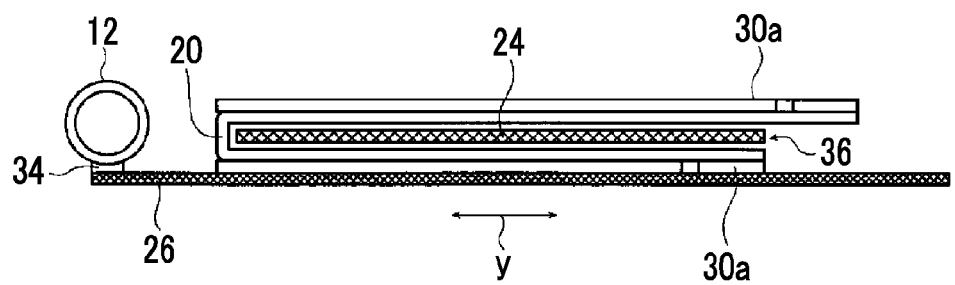

Next, as conceptually illustrated in FIGS. 6(A) and 6(B), the pinching body 36 is laminated on the permeating gas channel member 26 fixed to the central tube 12 and the permeating gas channel member 26 is bonded to the acidic gas separation layer 20 (porous support 22) by allowing the surface coated with the adhesive 30a to face the permeating gas channel member 26 and allowing the folded side to face the central tube 12.

Further, as illustrated in FIGS. 6(A) and 6(B), the upper surface of the laminated pinching body 36 (the surface on the longer side of the porous support 22) is coated with the adhesive 30a which becomes the adhesive layer 30. Moreover, in the description below, a direction of the side opposite to the permeating gas channel member 26 initially fixed to the central tube 12 by fixing means 34 is also referred to as the upper side.

As illustrated in FIG. 6(A), the adhesive 30a is also applied to the entire region by being extended to have a strip shape in the circumferential direction in the periphery of both end portions in the width direction in the same manner as described above, and is further applied to the entire region by being extended to have a strip shape in the periphery of the end portion in the width direction on the side opposite to the folded portion.

Figure 7:
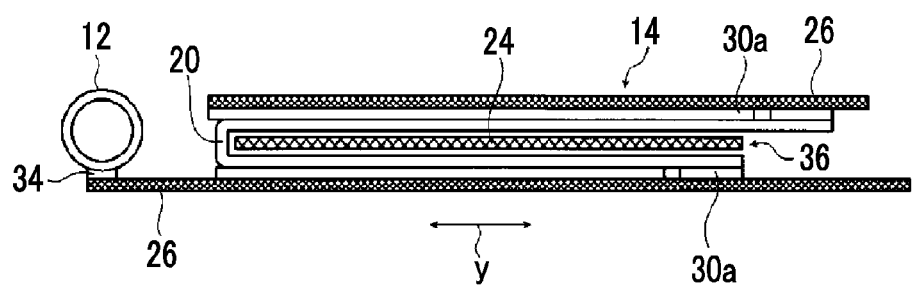
FIG. 7 is a conceptual view for describing the method of preparing the acidic gas separation module illustrated in FIG. 1.

Next, as conceptually illustrated in FIG. 7, the permeating gas channel member 26 is laminated on the pinching body 36 coated with the adhesive 30a, the acidic gas separation layer 20 (porous support 22) is bonded to the permeating gas channel member 26, and then the laminate 14 is formed.

Subsequently, in the same manner as described above, the pinching body 36 between which the supply gas channel member 24 is interposed is prepared using the acidic gas separation layer 20, the pinching body is coated with the adhesive 30a which becomes the adhesive layer 30, and the finally laminated permeating gas channel member 26 is laminated on the pinching body 36 such that they bond to each other by allowing the side coated with the adhesive to face the lower side.

In addition, in the same manner as described above, the upper surface of the laminated pinching body 36 is coated with the adhesive 30a as illustrated in FIG. 6(A), the permeating gas channel member 26 is laminated thereon as illustrated in FIG. 7 such that they bond to each other, and then the second layer of the laminate 14 is laminated thereon.

Hereinafter, the processes of FIGS. 5 to 7 are repeatedly performed, and a predetermined number of sheets of laminates 14 are laminated as conceptually illustrated in FIG. 8.

Figure 8:
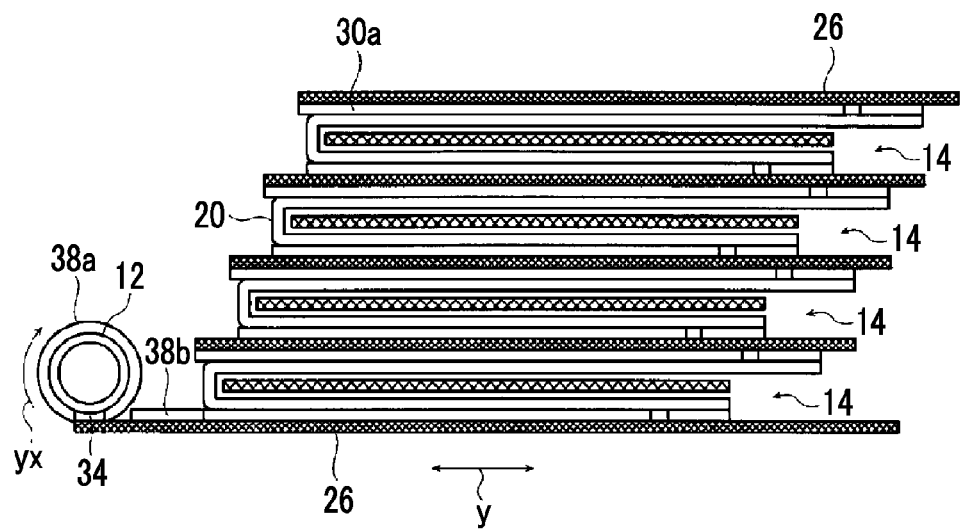
FIG. 8 is a conceptual view for describing the method of preparing the acidic gas separation module illustrated in FIG. 1.

Further, at this time, it is preferable that the laminates 14 are laminated in order to become gradually farther away from the central tube 12 in the circumferential direction toward the upper side as illustrated in FIG. 8. In this manner, the winding of the laminates 14 around the central tube 12 (the laminates 14 are wrapped around the central tube 12) becomes easy and the end portion or the periphery of the end portion of the central tube 12 side of each permeating gas channel member 26 can be suitably brought into contact with the central tube 12.

When a predetermined number of laminates 14 are laminated on each other, an adhesive 38a is applied to the outer peripheral surface of the central tube 12 and an adhesive 38b is applied to a space between the pinching body 36 and the central tube 12 on the upper surface of the permeating gas channel member 26 initially fixed to the central tube 38 as illustrated in FIG. 8.

Next, as indicated by an arrow yx in FIG. 8, the laminates 14 are wound around the central tube 12 (the laminates 14 are wrapped around the central tube 12) such that the laminated laminates 14 are rolled up.

Here, in the separation module 10 of the present invention, the fiber diameter of the supply gas channel member 24 is in a range of 100 µm to 900 µm, and the area ratio of the concave portions inscribed in a hemisphere having a diameter greater than or equal to three-quarters of the fiber diameter of the supply gas channel member 24 is 50% or less in a surface of the auxiliary support film 22b. For this reason, the position of the facilitated transport film 21 moves relative to the position of the supply gas channel member 24 and thus damage to the facilitated transport film 21 can be suitably prevented even when the facilitated transport film 21 slidably comes into contact with the supply gas channel member 24 at the time of winding the laminate around the central tube 12.

When the winding is finished, the state in which tension is applied to the permeating gas channel member 26 of the outermost periphery (that is, the lowermost layer initially fixed to the central tube 12) in the drawing direction (winding direction) is maintained for a predetermined time and the adhesive 30a or the like is dried.

When the predetermined time has elapsed, the permeating gas channel member 26 of the outermost periphery is fixed to a position, at which the permeating gas channel member has gone round once, by ultrasonic welding or the like, the extra permeating gas channel member 26 outward from the fixation position is cut, and then the spiral laminate 14a obtained by laminating the laminated laminates 14 around the central tube 12 is completed.

As described above, the raw material gas G is supplied from the end portion of the supply gas channel member 24, and the acidic gas Gc passes through (is transported to) the acidic gas separation layer 20 in the lamination direction, flows into the permeating gas channel member 26, flows through the permeating gas channel member 26, and reaches the central tube 12.

Here, the porous support 22 is coated with the adhesive 30a and the permeating gas channel member 26 having a network structure is bonded using the adhesive 30a. Accordingly, the adhesive 30a infiltrates (impregnation) into the porous support 22 and the permeating gas channel member 26 and then the adhesive layers 30 are formed in the inside of the porous support 22 and the permeating gas channel member 26.

Further, as described above, the adhesive layer 30 (adhesive 30a) is formed to have a strip shape by being extended in the entire region in the circumferential direction in the periphery of both end portions in the width direction. In addition, the adhesive layer 30 is formed to have a strip shape by being extended in the entire region in the width direction in the periphery of the end portion on the side opposite to the folded portion which becomes the central tube 12 side such that the adhesive layer crosses the adhesive 30 in the width direction in the periphery of both end portions in the width direction. That is, the adhesive layer 30 is open at the central tube 12 side and is formed so as to enclose the outer periphery of the permeating gas channel member 26 and the porous support 22. In addition, the permeating gas channel member 26 is brought into a state of being interposed between the facilitated transport films 21.

In this manner, an envelope-like channel in which the central tube 12 side is open is formed in the permeating gas channel member 26 of the laminate 14. Accordingly, the acidic gas Gc, which permeates into the acidic gas separation layer 20 and flows into the permeating gas channel member 26, flows through the permeating gas channel member 26 toward the central tube 12 without flowing out, and flows into the central tube 12 from the through-holes 12a.

In the separation module 10 of the present invention, various kinds of known adhesive can be used as long as the adhesive layer 30 (adhesive 30a) has sufficient adhesive strength, heat resistance, and moisture resistance.

Examples thereof include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, polyester, a cellulose derivative (nitrocellulose or the like), a styrene-butadiene copolymer, various synthetic rubber resins, a phenol resin, a urea resin, a melamine resin, a phenoxy resin, a silicon resin, and a urea formamide resin.

Further, the adhesive 30a which becomes the adhesive layer 30 may be applied once, but it is preferable that an adhesive diluted with an organic solvent such as acetone is applied and then only the adhesive is applied to the same place. At this time, it is preferable that the adhesive diluted with an organic solvent is applied over a wide area and adhesive which is not diluted is applied in a width narrower than that of the adhesive diluted with an organic solvent.

In this manner, the adhesive layer 30 (adhesive 30a) can suitably infiltrate into the porous support 22 and the permeating gas channel member 26.

In the separation module 10 of the present invention, the telescoping prevention plate (telescoping prevention member) 16 is arranged in both end portions of the spiral laminate 14a prepared in this manner.

As described above, the telescoping prevention plate 16 is a member used for preventing a so-called telescoping phenomenon in which the spiral laminate 14a is pressed by the raw material gas G, the end surface on the supply side is pushed in a nested shape, and the end surface on the opposite side protrudes in a nested shape.

In the present invention, various kinds of known telescoping prevention plate used for a spiral-type separation module can be used as the telescoping prevention plate 16.

In the example of the figure, the telescoping prevention plate includes a circular outer ring portion 16a; a circular inner ring portion 16b arranged such that the center thereof corresponds to the center of the outer ring portion 16a; and ribs (spokes) 16c which connect the outer ring portion 16a with the inner ring portion 16b such that they are fixed to each other. As described above, the central tube 12 around which the laminate 14 is wound is inserted into the inner ring portion 16b.

In the example of the figure, the ribs 16c are radially provided at an equal angle interval from the center of the outer ring portion 16a and the inner ring portion 16b and gaps of each rib 16c between the outer ring portion 16a and the inner ring portion 16b become opening portions 16d through which the raw material gas G or the residual gas Gr passes.

Further, the telescoping prevention plate 16 may be arranged such that the telescoping prevention plate 16 is brought into contact with the end surface of the spiral laminate 14a. However, in order for the entire region of the end surface of the spiral laminate 14a to be used for supply of the raw material gas or discharge of the residual gas Gr, the end surfaces of the telescoping prevention plate 16 and the spiral laminate 14a are normally arranged with small gaps therebetween.

Various materials having sufficient strength, heat resistance, and moisture resistance can be used as the materials of forming the telescoping prevention plate 16.

Preferred specific examples thereof include metal materials (such as stainless steel (SUS), aluminum, an aluminum alloy, tin, and a tin alloy); resin materials (such as a polyethylene resin, a polypropylene resin, an aromatic polyamide resin, nylon 12, nylon 66, a polysulfone resin, a polytetrafluoroethylene resin, a polycarbonate resin, an acrylic-butadiene-styrene resin, an acrylic-ethylene-styrene resin, an epoxy resin, a nitrile resin, a polyether ether ketone resin (PEEK), a polyacetal resin (POM), and a polyphenylene sulfide resin (PPS)); fiber-reinforced plastics of these resins (glass fibers, carbon fibers, stainless steel fibers, and aramid fibers are exemplified as fibers. Among these, long fibers are particularly preferable and specific examples thereof include long glass fiber-reinforced polypropylene and long glass fiber-reinforced polyphenylene sulfide); and ceramics (such as zeolite and alumina).

In addition, when a resin is used, a resin reinforced by glass fibers may be used.

The coating layer 18 covers the peripheral surface of the spiral laminate 14a and blocks discharge of the raw material gas G or the residual gas Gr outside other than from the end surface of the peripheral surface thereof, that is, the spiral laminate 14a.

Various kinds of material which can shield the raw material gas G or the like from being discharged can be used as the coating layer 18. Further, the coating layer 18 may be a tubular member or may be configured by winding a wire or a sheet-like member.

As an example, a coating layer 18 obtained by impregnating a wire made of FRP with an adhesive used for the above-described adhesive layer 30 and winding the wire impregnated with the adhesive around the spiral laminate 14a, without any space left, multiple times if necessary is exemplified.

At this time, as needed, a sheet-like member such as a Kapton tape which prevents permeation of an adhesive into the spiral laminate 14a may be provided between the coating layer 18 and the spiral laminate 14a.

Hereinbefore, the separation module (spiral-type acidic gas separation module) of the present invention has been described in detail, but the present invention is not limited to the examples described above. Further, various improvements or modifications are possible within the range not departing from the scope of the present invention.

EXAMPLES

Hereinafter, an acidic gas separation module of the present invention will be described in detail with reference to specific examples of the present invention.

Example 1

Preparation of Acidic Gas Separation Layer

An aqueous solution containing 2.4% by mass of a polyvinyl alcohol-polyacrylic acid copolymer (KURASTOMER AP-20, manufactured by KURARAY CO., LTD.) and 0.01% by mass of a crosslinking agent (a 25 mass % glutaraldehyde aqueous solution, manufactured by Wako Pure Chemical Industries, Ltd.) was prepared. 1 M hydrochloric acid was added to the aqueous solution such that the pH thereof became 1.5 and cross-linking was allowed to occur in the solution.

After cross-linking was allowed to occur in the solution, a 40% cesium carbonate aqueous solution (manufactured by Kisan Kinzoku Chemicals Co., Ltd.) was added thereto such that the concentration of cesium carbonate became 5.0% by weight, thereby preparing a coating composition. That is, in the present example, cesium carbonate became a carrier of the facilitated transport film 21.

The acidic gas separation layer 20 formed of the facilitated transport film 21 and the porous support 22 was prepared by coating a porous support (laminate (manufactured by General Electric Company)) obtained by laminating porous PTFE on the surface of PP non-woven fabric) with the coating composition and drying the support.

That is, the porous support 22 was obtained by laminating non-woven fabric as the auxiliary support film 22b and PTFE as the porous film 22a on each other.

The thickness of the facilitated transport film 21 was set to 160 μm. In addition, the water absorption rate of the facilitated transport film 21 was 21%.

The area ratio of a concave portion in the auxiliary support film 22b was 5%.

Further, the area ratio of the concave portion V on the surface of the auxiliary support film 22b was acquired by performing three-dimensional image analysis in a region having dimensions of 3 cm$^2$ and measuring concave portions inscribed in a hemisphere having a diameter greater than or equal to three-quarters of the fiber diameter of the supply gas channel member 24 using a laser microscope (VK-X200, manufactured by KEYENCE CORPORATION). Measurement was performed at ten places on the surface of the auxiliary support film 22b and the average value thereof was set as the area ratio of the concave portion.

<Preparation of Separation Module>

First, as illustrated in FIGS. 4(A) and 4(B), the permeating gas channel member 26 (tricot-knitted epoxy-impregnated polyester) was fixed to the central tube 12.

In addition, a polypropylene net having a thickness of 1.6 mm was used as the supply gas channel member 24. The fiber diameter was 850 μm and the tensile elastic modulus was 800 MPa.

The tensile elastic modulus was measured by performing a tension test at a tension rate of 10 mm/min with a tension tester (TENSILON RTC-1150A, manufactured by ORIENTEC Co., LTD.) using a test piece obtained by cutting the supply gas channel member 24 into a strip form having a length of 50 mm and a width of 10 mm in conformity with JIS K7127. At the time of calculation of the tensile elastic modulus, a rectangular shape of the size of the test piece was set as the volume of the test piece without considering a space between fibers.

Next, the acidic gas separation layer 20 was folded into two by putting the facilitated transport film 21 on the inside thereof. The acidic gas separation layer 20 was folded into two such that one side of the acidic gas separation layer 20 became slightly longer than the other as illustrated in FIG. 5. A Kapton tape was adhered to the valley portion of the acidic gas separation layers 20 folded into two for reinforcement so that the film valley portion of the facilitated transport film 21 was not damaged by the end portion of the supply gas channel member 24.

Next, the supply gas channel member 24 was interposed between the acidic gas separation layers 20 folded into two, thereby preparing the pinching body 36.

The adhesive 30a (E120HP, manufactured by Henkel Japan Ltd., Tokyo) formed of an epoxy resin having a high viscosity (approximately 40 Pa·s) was applied to the entire region by being extended in the circumferential direction (arrow y direction) in the periphery of both end portions in the width direction (arrow x direction) and applied to the entire region by being extended in the width direction in the periphery of the end portion on the side opposite to the folded portion in the circumferential direction on the porous support 22 side of one side, in which the acidic gas separation layer 20 of the pinching body 36 was shorter as illustrated in FIG. 5.

Next, as illustrated in FIG. 6(B), the side coated with the adhesive 30a was turned to face the lower side and the pinching body 36 was laminated on the permeating gas channel member 26 fixed to the central tube 12 such that they were bonded to each other.

Subsequently, as illustrated in FIG. 6(A), the adhesive 30a was applied to the entire region by being extended in the circumferential direction in the periphery of both end portions in the width direction and applied to the entire region by being extended in the width direction in the periphery of the end portion on the side opposite to the folded portion in the circumferential direction on the upper surface of the acidic gas separation layer 20 of the pinching body 36 laminated on the permeating gas channel member 26. Further, the permeating gas channel member 26 was laminated on the acidic gas separation layer 20 coated with the adhesive 30a and the acidic gas separation layer 20 and the permeating gas channel member 26 were bonded to each other as illustrated in FIG. 7, thereby forming the first layer of the laminate 14.

In the same manner as described above, another pinching body 36 formed of the acidic gas separation layer 20, illustrated in FIG. 5, was prepared and the adhesive 30a was similarly applied to the porous support 22 on a shorter acidic gas separation layer 20 side. Next, in the same manner as illustrated in FIG. 6(A), the side coated with the adhesive 30*a* was turned to face the first layer of the laminate 14 (the permeating gas channel member 26 thereof) which was initially formed, the pinching body 36 was laminated on the first layer of the laminate 14 (permeating gas channel member 26), and the pinching body and the laminate 14 were bonded to each other. Moreover, the upper surface of the pinching body 36 was coated with the adhesive 30*a* in the same manner as illustrated in FIG. 6(A), the permeating gas channel member 26 was laminated on the pinching body 36 in the same manner as illustrated in FIG. 7, and then the pinching body 36 and the permeating gas channel member 26 were bonded to each other, thereby forming the second layer of the laminate 14.

In addition, the third layer of the laminate 14 was formed on the second layer of the laminate 14 in the same manner as that of the second layer.

After the third layer of the laminate 14 was laminated on the permeating gas channel member 26 fixed to the central tube 12, the peripheral surface of the central tube 12 was coated with the adhesive 38*a* as illustrated in FIG. 8, and then the permeating gas channel member 26 between the central tube 12 and the lowermost layer of the laminate 14 was further coated with the adhesive 38*b*. As the adhesives 38*a* and 38*b*, the same materials as the adhesive 30*a* were used.

Next, the laminated three layers of the laminates 14 were wound around the central tube 12 multiple times such that the laminates 14 were rolled around the central tube 12 by the central tube 12 being rotated in the arrow yx direction of FIG. 8 and tension was applied in a direction in which the laminate 14 was pulled, the spiral laminate 14*a* thereby being obtained.

In addition, the central tube 12 was inserted into the inner ring portions 16*b* and telescoping prevention plates 16, made of SUS, having a thickness of 2 cm in the form illustrated in FIG. 8 were attached to both end portions of the spiral laminate 14*a*.

Moreover, the coating layer 18 was formed by winding an FPR resin tape around the peripheral surface of the telescoping prevention plate 16 and the peripheral surface of the spiral laminate 14*a* and sealing the peripheral surfaces, and then the separation module 10 having a diameter of 4 cm and a width of 30 cm illustrated in FIG. 1 was prepared. In addition, the thickness of the coating layer 18 was set to 5 mm.

Example 2

A separation module was prepared in the same manner as in Example 1 except that the area ratio of a concave portion of the auxiliary support film 22*b* was set to 40%.

Example 3

A separation module was prepared in the same manner as in Example 1 except that the fiber diameter of the supply gas channel member 24 was set to 250 μm, the tensile elastic modulus thereof was set to 620 MPa, and the area ratio of a concave portion of the auxiliary support film 22*b* was set to 15%.

Example 4

A separation module was prepared in the same manner as in Example 3 except that the area ratio of a concave portion of the auxiliary support film 22*b* was set to 45%.

Example 5

A separation module was prepared in the same manner as in Example 1 except that the fiber diameter of the supply gas channel member 24 was set to 120 μm, the tensile elastic modulus thereof was set to 510 MPa, and the area ratio of a concave portion of the auxiliary support film 22*b* was set to 10%.

Example 6

A separation module was prepared in the same manner as in Example 5 except that the area ratio of a concave portion of the auxiliary support film 22*b* was set to 30%.

Example 7

A separation module was prepared in the same manner as in Example 4 except that the film thickness of the facilitated transport film 21 was set to 10 μm and the water absorption rate was set to 2%.

Example 8

A separation module was prepared in the same manner as in Example 7 except that the water absorption rate of the facilitated transport film 21 was set to 7.3%.

Example 9

A separation module was prepared in the same manner as in Example 7 except that the water absorption rate of the facilitated transport film 21 was set to 19%.

Examples 10 to 12

Separation modules 10 were prepared in the same manner as in Examples 7 to 9 except that the film thickness of the facilitated transport film 21 was set to 70 μm.

Examples 13 to 15

Separation modules 10 were prepared in the same manner as in Examples 7 to 9 except that the film thickness of the facilitated transport film 21 was set to 120 μm.

Example 16

A separation module 10 was prepared in the same manner as in Example 7 except that the fiber density of the supply gas channel member 24 was changed and the tensile elastic modulus was set to 2.1 MPa.

Example 17

A separation module 10 was prepared in the same manner as in Example 9 except that the fiber density of the supply gas channel member 24 was changed and the tensile elastic modulus was set to 2.1 MPa.

Example 18

A separation module 10 was prepared in the same manner as in Example 11 except that the fiber density of the supply gas channel member 24 was changed and the tensile elastic modulus was set to 6 MPa.

Example 19

A separation module 10 was prepared in the same manner as in Example 12 except that the fiber density of the supply gas channel member 24 was changed and the tensile elastic modulus was set to 6 MPa.

Example 20

A separation module 10 was prepared in the same manner as in Example 15 except that the fiber density of the supply gas channel member 24 was changed and the tensile elastic modulus was set to 320 MPa.

Example 21

A separation module 10 was prepared in the same manner as in Example 8 except that a hydrophobic intermediate layer described below was provided between the porous film 22a and the facilitated transport film.

As a silicone coating solution which was used for forming an intermediate layer, KF-102 (manufactured by Shin-Etsu Chemical Co., Ltd.) was used. In addition, 0.5% by weight of 4-isopropyl-4'-methyldiphenyliodonium tetrakis(pentafluorophenyl)borate (manufactured by Tokyo Chemical Industry Co., Ltd.) was added to a silicone resin as a curing agent.

First, the surface of the porous film 22a was coated with the silicone coating solution and irradiated with ultraviolet rays, and the silicone coating solution was cured, and then an intermediate layer was formed on the porous support 22. The intermediate layer was formed on the porous support 22 using RtoR and the conveying speed of the support was set to 50 m/min. Moreover, after the silicone coating solution was applied, the irradiation position and the irradiation amount of ultraviolet rays in a curing device 28 were adjusted such that the silicone coating solution was cured within 2 seconds. The thickness of the intermediate layer after curing was set to 2 µm.

Thereafter, the facilitated transport film 21 was formed on the intermediate layer in the same manner as in Example 1.

Example 22

A separation module 10 was prepared in the same manner as in Example 11 except that an intermediate similar to that of Example 21 was provided between the porous film 22a and the facilitated transport film.

Comparative Example 1

A separation module was prepared in the same manner as in Example 1 except that the area ratio of the concave portion of the auxiliary support film 22b was set 60%.

Comparative Example 2

A separation module was prepared in the same manner as in Example 1 except that the area ratio of the concave portion of the auxiliary support film 22b was set 70%.

Five separation modules 10 were prepared for each Example and Comparative Example.

[Performance Evaluation]
<Air Tightness (Production Stability)>

The discharge side of the prepared separation module 10 was blocked, the separation module was filled with He gas from the supply side until the pressure therein became 0.34 MPa and then sealed, and the time taken for the pressure in the inside of the separation module 10 to decrease to 0.3 MPa was measured.

A separation module 10 which took 10,000 seconds or longer until the pressure decreased to 0.3 MPa was determined as a suitable module and then evaluation was performed by considering the number of suitable separation modules 10 from the five modules. The evaluation was performed based on the following criteria.

A: The number of suitable modules 10 was 4 or more from among five modules.

B: The number of suitable modules 10 was 1 to 3 from among five modules.

C: The number of suitable modules 10 was none from among five modules.

<Separation Performance>

A mixed gas having a ratio of "$H_2:CO_2:H_2O=45:5:50$ (partial pressure ratio)" was supplied to the prepared separation module 10 as raw material gas G for a test under the conditions of a flow rate of 2.2 L/min, a temperature of 130° C., and a total pressure of 301.3 kPa. In addition, through-holes used for supplying sweep gas were formed in the end portion of the central tube 12 on the supply gas supply side and Ar gas having a flow rate of 0.6 L/min was supplied as sweep gas from the through-holes.

Gas (acidic gas Gc and residual gas Gr) permeating into the separation module 10 was analyzed using gas chromatography and the $CO_2$ permeation rate ($P(CO_2)$) was calculated. In addition, a unit GPC of the permeation rate was "1 GPU=$[1\times10^{-6}$ cm$^3$ (STP)]/[s·cm$^2$·cm Hg]$."

The average value of the $CO_2$ permeation rates of five separation modules 10 was calculated for each column and the separation performance was evaluated. The evaluation was performed based on the following criteria.

A: The average value of the $CO_2$ permeation rates was 30 GPU or greater.

B: The average value of the $CO_2$ permeation rates was 20 GPU to less than 30 GPU.

C: The average value of the $CO_2$ permeation rates was less than 20 GPU.

<Comprehensive Evaluation>

The performance of the separation module 10 was evaluated based on the following evaluation criteria.

A: Both of the airtightness and the separation performance were evaluated as A.

B: One of the airtightness and the separation performance was evaluated as A and the other was evaluated as B.

C: Both of the airtightness and the separation performance were evaluated as B.

D: At least one of the airtightness and the separation performance was evaluated as C.

Various elements of respective separation modules 10 and the evaluation results described above are listed in the following table. Further, "-" in columns of the results of the performance evaluation indicates that the evaluation was not possible because defects were generated when the separation module was prepared.

TABLE 1

| | Supply gas channel member | | Auxiliary support film | Intermediate layer | Facilitated transport film | | Evaluation | | |
|---|---|---|---|---|---|---|---|---|---|
| | Fiber diameter (μm) | Tensile elastic modulus (MPa) | Area ratio of concave portions (%) | Film thickness (μm) | Film thickness (μm) | Water absorption rate (%) | Airtightness (production stability) | Separation performance | Determination |
| Example 1 | 850 | 800 | 5 | — | 160 | 21 | B | B | C |
| Example 2 | 850 | 800 | 40 | — | 160 | 21 | B | B | C |
| Example 3 | 250 | 620 | 15 | — | 160 | 21 | B | B | C |
| Example 4 | 250 | 620 | 45 | — | 160 | 21 | B | B | C |
| Example 5 | 120 | 510 | 10 | — | 160 | 21 | B | B | C |
| Example 6 | 120 | 510 | 30 | — | 160 | 21 | B | B | C |
| Example 7 | 250 | 620 | 45 | — | 10 | 2 | B | A | B |
| Example 8 | 250 | 620 | 45 | — | 10 | 7.3 | B | A | B |
| Example 9 | 250 | 620 | 45 | — | 10 | 19 | B | A | B |
| Example 10 | 250 | 620 | 45 | — | 70 | 2 | A | B | B |
| Example 11 | 250 | 620 | 45 | — | 70 | 7.3 | B | A | B |
| Example 12 | 250 | 620 | 45 | — | 70 | 19 | B | A | B |
| Example 13 | 250 | 620 | 45 | — | 120 | 2 | A | B | B |
| Example 14 | 250 | 620 | 45 | — | 120 | 7.3 | A | B | B |
| Example 15 | 250 | 620 | 45 | — | 120 | 19 | B | A | B |
| Example 16 | 250 | 2.1 | 45 | — | 10 | 2 | A | A | A |
| Example 17 | 250 | 2.1 | 45 | — | 10 | 19 | A | A | A |
| Example 18 | 250 | 6 | 45 | — | 70 | 7.3 | A | A | A |
| Example 19 | 250 | 6 | 45 | — | 70 | 19 | A | A | A |
| Example 20 | 250 | 320 | 45 | — | 120 | 19 | A | A | A |
| Example 21 | 250 | 620 | 45 | 3 | 10 | 7.3 | A | A | A |
| Example 22 | 250 | 620 | 45 | 3 | 70 | 7.3 | A | A | A |
| Comparative Example 1 | 850 | 800 | 60 | — | 160 | 21 | C | — | D |
| Comparative Example 2 | 850 | 800 | 70 | — | 160 | 21 | C | — | D |

As listed in the table above, all separation modules 10 of Examples 1 to 20 in which the fiber diameter of the supply gas channel member 24 was in a range of 100 μm to 900 μm and the area ratio of the concave portions inscribed in a hemisphere having a diameter greater than or equal to three-quarters of the fiber diameter of the supply gas channel member 24 was 50% or less on the surface of the auxiliary support film 22*b* had excellent airtightness and separation performance compared to those in Comparative Examples 1 and 2.

Among the separation modules, in the separation modules 10 of Examples 7 to 20 in which the film thickness of the facilitated transport film 21 was in a suitable range, one of airtightness and separation performance was evaluated as "A" and superior performance was exhibited.

Among the separation modules, in the separation modules 10 of Examples 16 to 20 in which the film thickness of the facilitated transport film 21 was in a suitable range and the tensile elastic modulus of the supply gas channel member 24 was in a preferred range, both of airtightness and separation performance were evaluated as "A" and particularly excellent performance was exhibited.

Moreover, from comparison between Example 8 with Example 21 and comparison between Example 11 with Example 22, it could be understood that the airtightness can be improved by forming an intermediate layer between the porous support 22 and the facilitated transport film 21 even when the area ratio of the concave portion of the auxiliary support film 22*b* is high (45%). It is assumed that the deformation amount accompanied by pushing in of the supply gas channel member 24 at a position corresponding to the concave portion can be reduced by forming an intermediate layer.

Meanwhile, in Comparative Examples 1 and 2 in which the area ratio of the concave portion of the auxiliary support film 22*b* exceeded 50%, it is assumed that the facilitated transport film 21 was greatly damaged by the supply gas channel member 24 when the laminate 14 was wound around the central tube 12 and thus the airtightness was insufficient and evaluation of the separation performance was not possible.

From the results described above, the effects of the present invention are evident.

EXPLANATION OF REFERENCES

10: (acidic gas) separation module
12: central tube
12*a*: through-hole
14: laminate
14*a*: spiral laminate
16: telescoping prevention plate
16*a*: outer ring portion
16*b*: inner ring portion
16*c*: rib
16*d*: opening portion
18: coating layer
20: acidic gas separation layer
21: facilitated transport film
22: porous support
22*a*: porous film
22*b*: auxiliary support film
24: supply gas channel member
26: permeating gas channel member
30: adhesive layer
30*a*, 38*a*, 38*b*: adhesive
34: fixing means
36: pinching body

What is claimed is:

1. A spiral-type acidic gas separation module comprising:
a central tube in a tube wall of which through-holes are formed;
a supply gas channel member, which becomes a raw material gas channel and is formed of at least one of woven fabric and unwoven fabric;
an acidic gas separation layer which separates an acidic gas from a raw material gas flowing in the supply gas channel member and includes a facilitated transport film that contains a carrier reacting with the acidic gas and a hydrophilic compound for carrying the carrier and a porous support that supports the facilitated transport film and allows the acidic gas separated from the facilitated transport film to pass through; and
a permeating gas channel member which becomes a channel from which the acidic gas that reacts with the carrier and permeates into the facilitated transport film flows into the central tube,
wherein the porous support is obtained by laminating a porous film, which is on the facilitated transport film side, on an auxiliary support film which is formed of at least one of woven fabric and unwoven fabric on the permeating gas channel member side,
the average value of the fiber diameter of the supply gas channel member is in a range of 100 µm to 900 µm,
with respect to a surface of the auxiliary support film that is on the side opposite to the facilitated transport film, the area ratio of concave portions inscribed in a hemisphere having a diameter greater than or equal to three-quarters of the fiber diameter of the supply gas channel member is 5% to 50%, and
at least one laminate which includes the supply gas channel member, the acidic gas separation layer, and the permeating gas channel member is wound around the central tube.

2. The spiral-type acidic gas separation module according to claim 1, wherein the thickness of the facilitated transport film is in a range of 5 µm to 150 µm.

3. The spiral-type acidic gas separation module according to claim 1, wherein the water absorption rate of the facilitated transport film is in a range of 1% to 20%.

4. The spiral-type acidic gas separation module according to claim 2, wherein the water absorption rate of the facilitated transport film is in a range of 1% to 20%.

5. The spiral-type acidic gas separation module according to claim 1, wherein the tensile elastic modulus of the supply gas channel member is in a range of 1 MPa to 500 MPa.

6. The spiral-type acidic gas separation module according to claim 2, wherein the tensile elastic modulus of the supply gas channel member is in a range of 1 MPa to 500 MPa.

7. The spiral-type acidic gas separation module according to claim 3, wherein the tensile elastic modulus of the supply gas channel member is in a range of 1 MPa to 500 MPa.

8. The spiral-type acidic gas separation module according to claim 4, wherein the tensile elastic modulus of the supply gas channel member is in a range of 1 MPa to 500 MPa.

9. The spiral-type acidic gas separation module according to claim 1, wherein the supply gas channel member has a network structure formed of threads containing one or more resins selected from polyethylene, polystyrene, polyethylene terephthalate, polytetrafluoroethylene, polyethersulfone, polyphenylene sulfide, polysulfone, polypropylene, polyimide, polyetherimide, polyether ether ketone, and polyvinylidene fluoride.

10. The spiral-type acidic gas separation module according to claim 8, wherein the supply gas channel member has a network structure formed of threads containing one or more resins selected from polyethylene, polystyrene, polyethylene terephthalate, polytetrafluoroethylene, polyethersulfone, polyphenylene sulfide, polysulfone, polypropylene, polyimide, polyetherimide, polyether ether ketone, and polyvinylidene fluoride.

11. The spiral-type acidic gas separation module according to claim 1, wherein the acidic gas separation layer further includes a hydrophobic intermediate layer between the facilitated transport film and the porous support.

12. The spiral-type acidic gas separation module according to claim 10, wherein the acidic gas separation layer further includes a hydrophobic intermediate layer between the facilitated transport film and the porous support.

13. The spiral-type acidic gas separation module according to claim 11, wherein the intermediate layer is a layer containing a silicone resin.

14. The spiral-type acidic gas separation module according to claim 12, wherein the intermediate layer is a layer containing a silicone resin.

15. The spiral-type acidic gas separation module according to claim 1, wherein the laminate has a structure in which the permeating gas channel member is laminated on a pinching body, said pinching body formed by interposing the supply gas channel member between the acidic gas separation layer which is folded into two so that the facilitated transport film is inside.

16. The spiral-type acidic gas separation module according to claim 14, wherein the laminate has a structure in which the permeating gas channel member is laminated on a pinching body, said pinching body formed by interposing the supply gas channel member between the acidic gas separation layer which is folded into two so that the facilitated transport film is inside.

* * * * *